(12) United States Patent
Porter et al.

(10) Patent No.: US 7,096,970 B1
(45) Date of Patent: Aug. 29, 2006

(54) COMPACT BED EDGING MACHINE

(76) Inventors: Roger D. Porter, 7882 E. Highway 19, Loris, SC (US) 29569; Jerome C. Burroughs, P.O. Box 776, Loris, SC (US) 29569

( * ) Notice: Subject to any disclaimer, the term of this patent is extended or adjusted under 35 U.S.C. 154(b) by 0 days.

(21) Appl. No.: 11/063,256

(22) Filed: Feb. 22, 2005

Related U.S. Application Data

(63) Continuation of application No. 09/966,477, filed on Sep. 28, 2001, now Pat. No. 6,874,581, which is a continuation-in-part of application No. 29/117,980, filed on Feb. 2, 2000, now Pat. No. Des. 451,930.

(51) Int. Cl.
*A01B 33/00* (2006.01)

(52) U.S. Cl. .......................................... 172/42; 37/355

(58) Field of Classification Search .................. 172/15, 172/16, 17, 42, 43, 120, 123, 749, 108, 118, 172/125; 37/142.5, 94, DIG. 8; 405/174, 405/179, 180, 181; 56/12.7; 30/276, DIG. 5
See application file for complete search history.

(56) References Cited

U.S. PATENT DOCUMENTS

| | | | |
|---|---|---|---|
| 917,821 A | 4/1909 | White |
| 2,088,534 A | 7/1937 | Pittman |
| 2,138,239 A | 11/1938 | Irgens |
| 2,555,441 A | 6/1951 | Hackney |
| 2,664,807 A | 1/1954 | Hedick |
| 2,680,945 A | 6/1954 | Reed |
| 2,718,838 A | 9/1955 | Schumacher |
| 2,737,105 A | 3/1956 | Wilson |
| 2,791,875 A | 5/1957 | Faas |
| 2,792,900 A | 5/1957 | Howard |
| 2,823,597 A | 2/1958 | Kelsey |
| 2,893,497 A | 7/1959 | Vellenzer |
| 2,903,077 A | 9/1959 | Kamlukin |
| 2,928,479 A | 3/1960 | Peterson |
| 2,967,579 A | 1/1961 | Howard |
| 2,997,276 A | 8/1961 | Davis |
| 3,031,018 A | 4/1962 | Smithers |
| 3,132,539 A | 5/1964 | Hotz |
| 3,199,235 A | 8/1965 | Stacey |
| 3,218,789 A | 11/1965 | Ott et al. |

(Continued)

FOREIGN PATENT DOCUMENTS

SU          1082908          3/1984

*Primary Examiner*—Thomas B. Will
*Assistant Examiner*—Alexandra Pechhold
(74) *Attorney, Agent, or Firm*—Leatherwood Walker Todd & Mann, P.C.; Thomas W. Epting

(57) ABSTRACT

A combination machine for trenching, for forming the edge of a bed, and for laying and burying tubing, cable, piping, and the like. The machine includes steerable caster wheels mounted on the rear of the machine which, together with a single front wheel, allow for a tight turning radius when using the machine. The machine also includes a blade height adjustment which allows for the trenching or edging blade depth to be readily adjusted in a substantially infinite variation. Other aspects of the present invention include an edging machine and a trenching machine, both being of a compact design. Both include an extendable handle which, in a preferred embodiment retracts or folds to allow for the volume of space occupied by the machines to be minimized, preferably, to the extent that either of such machines can typically be carried in a trunk of a standard automobile.

2 Claims, 27 Drawing Sheets

U.S. PATENT DOCUMENTS

| | | |
|---|---|---|
| 3,319,365 A | 5/1967 | Perry et al. |
| 3,442,335 A | 5/1969 | Silbereis et al. |
| 3,496,973 A | 2/1970 | Ballard |
| 3,656,554 A | 4/1972 | Buhner |
| 3,923,102 A | 12/1975 | Morris |
| 3,938,249 A | 2/1976 | Chacon |
| 3,958,347 A | 5/1976 | Heitman |
| 4,002,205 A | 1/1977 | Falk |
| 4,011,913 A | 3/1977 | Davies, III et al. |
| 4,043,399 A | 8/1977 | Morrison |
| 4,050,260 A | 9/1977 | Lemay |
| 4,071,922 A | 2/1978 | Davies, III et al. |
| 4,072,195 A | 2/1978 | Carlson |
| 4,094,362 A | 6/1978 | Hild |
| 4,096,964 A | 6/1978 | Glick |
| D249,518 S | 9/1978 | Cognata et al. |
| 4,188,934 A | 2/1980 | Reinhardt et al. |
| 4,286,670 A | 9/1981 | Ackerman |
| 4,346,764 A | 8/1982 | Rossi |
| 4,392,538 A | 7/1983 | Goertzen |
| 4,402,366 A | 9/1983 | Dankel |
| 4,421,178 A | 12/1983 | Vandelli et al. |
| 4,503,630 A | 3/1985 | Riley |
| 4,511,004 A | 4/1985 | Deneen |
| D280,824 S | 10/1985 | Mikado |
| 4,545,438 A | 10/1985 | Giovanni |
| D287,132 S | 12/1986 | Forbes |
| 4,625,810 A | 12/1986 | Edmisson |
| 4,640,366 A | 2/1987 | Saito |
| D297,238 S | 8/1988 | Horikawa et al. |
| 4,825,569 A | 5/1989 | Porter |
| 4,843,743 A | 7/1989 | Durieux |
| 4,914,840 A | 4/1990 | Porter |
| 4,939,854 A | 7/1990 | Boren |
| 4,958,457 A | 9/1990 | Doskocil |
| 4,979,573 A | 12/1990 | Williamson |
| 5,009,270 A | 4/1991 | Vangsgard |
| 5,119,880 A | 6/1992 | Zehrung, Jr. et al. |
| 5,226,248 A | 7/1993 | Pollard |
| 5,228,221 A | 7/1993 | Hillard et al. |
| 5,241,946 A | 9/1993 | Yelton et al. |
| 5,320,451 A | 6/1994 | Garvey et al. |
| 5,355,597 A | 10/1994 | Pollard |
| 5,381,780 A | 1/1995 | Yelton et al. |
| 5,499,686 A | 3/1996 | Parker |
| 5,735,064 A | 4/1998 | Holl |
| D415,173 S | 10/1999 | Zaun |
| D416,026 S | 11/1999 | Ohsumi et al. |
| 6,474,747 B1 | 11/2002 | Beaulieu et al. |
| 2003/0178208 A1 | 9/2003 | Abenroth et al. |
| 2004/0079538 A1 | 4/2004 | Zerrer et al. |
| 2005/0006110 A1 | 1/2005 | Wessel |

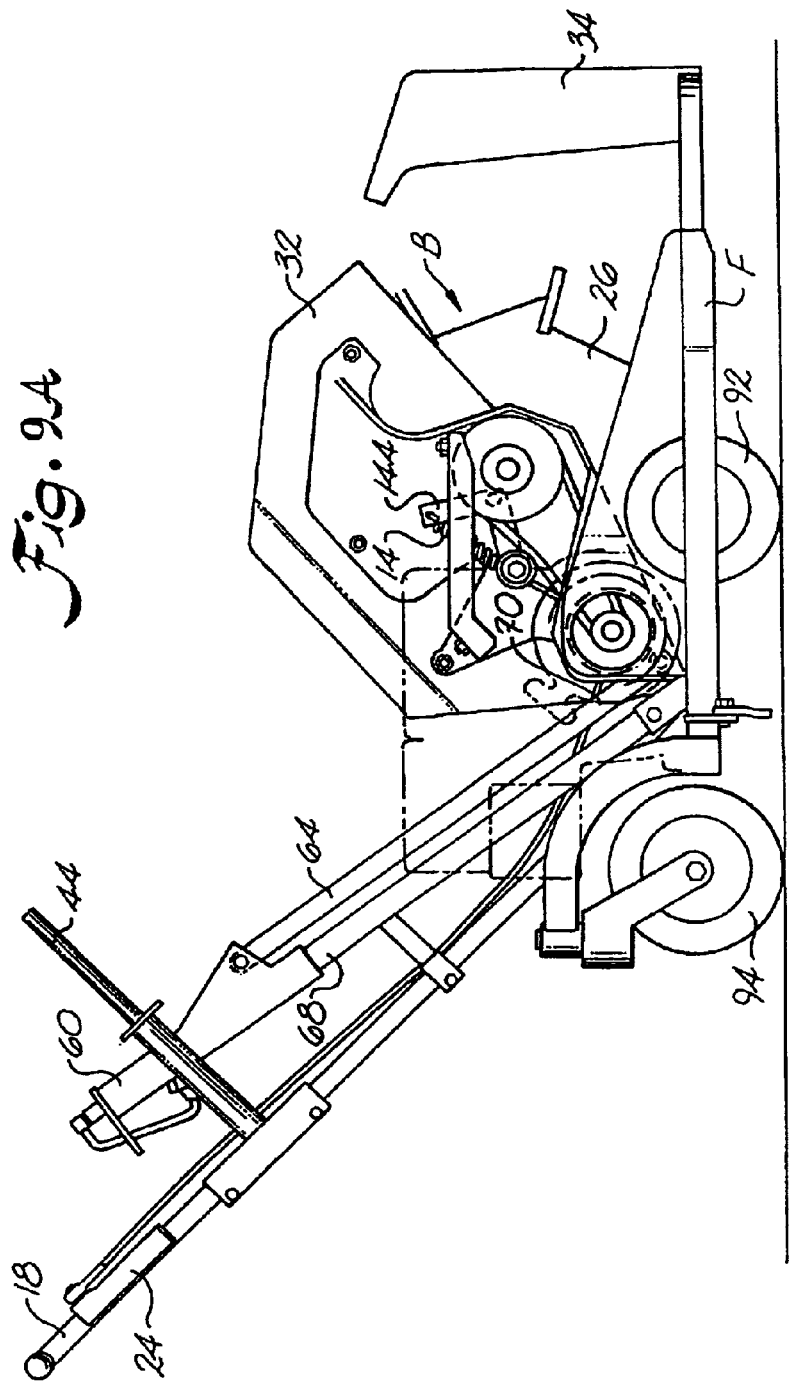

COMPACT BED EDGING MACHINE

BACKGROUND OF THE INVENTION

This is a continuation of application Ser. No. 09/966,477, filed Sep. 28, 2001, now U.S. Pat. No. 6,874,581, which is a continuation-in-part of design Application No. 29/117,980, filed Feb. 2, 2000, now U.S. Design Patent No. US D451,930 S, and the entirety of the foregoing applications is incorporated by reference.

This invention relates generally to a trenching and edging devices for digging trenches and for edging the soil for beds for flowers, shrubbery, mulch, etc.

Small trenching machines find application in those circumstances where it is necessary to dig a relatively narrow trench. This could be the case where cable TV is being buried to provide service to a residence or business, or could be when it is necessary to run a gas line, waterline, or other utility to a home or office. Further uses of such a trench could be for running irrigation line or what is known as radio or "invisible" fencing used to keep pets within a confined area, the pet then wearing a cooperating collar which is activated to shock the animal in the event the animal comes too close to the buried line.

Edging machines find use with landscapers and homeowners for defining a bed used for ornamental plantings, shrubbery, flowers, mulch, or the like and serve to form the defined edge of a bed to be created by cutting the soil to a depth, typically several inches, and then lifting the soil and moving it outwardly to form a mounded periphery for the bed. Generally, it is desirable that the turf adjacent the bed have a distinct, clean break between it and the bed. This provides for a clean definition of the bed which is desired for aesthetic and maintenance purposes.

In certain instances, use of a trencher or edging machine is complicated by the fact that such machines are large, bulky, and heavy. They may require the use of a truck or trailer for transport, and may require two or more persons in order to load or unload the machine. Once in operation, because of the size and weight of such machines, they may pose a problem for use by someone of lesser strength or stature. Further, by requiring a larger vehicle, such as a truck, or sport utility vehicle, or alternately, use of a trailer, for transport, such machines may find only limited use, and their full potential for use may not be recognized.

Trenching machines and edging machines are known. For example, U.S. Pat. No. 4,939,854, issued to Boren, discloses a trencher having a digging depth adjustment configuration including a rotatable handle in order to accomplish such depth adjustment. U.S. Pat. No. 4,002,205, issued to Falk, and U.S. Pat. No. 5,226,248, issued to Pollard, both disclose bed edge forming machines for forming the edge of a bed. U.S. Pat. No. 5,320,451, issued to Garvey, et al, discloses a tiller having a cable-laying attachment and also a provision for carrying a spool of cable, and a feed tube through which the cable is inserted into a trench. U.S. Pat. No. 5,009,270, issued to Vangsgard, discloses a sod-cutting machine having an adjustable depth adjustment, and U.S. Pat. No. 4,958,457, issued to Doskocil, and U.S. Pat. No. 4,979,573, issued to Williamson, both disclose devices using caster wheels for steering. The Doskocil device includes rear-mounted casters.

In view of the foregoing known devices, there still exists a need for a combination trenching and edging device which is designed to facilitate movement and steering of the device and which also can be used to dig at varying depths.

A need also exists for a trenching machine and an edging machine which are relatively lightweight and of relatively compact size to allow their easy transport and use by a wide variety of users. Ideally, such machines would be small enough to fit into the trunk of an ordinary sedan and light enough to be loaded and unloaded by one or two persons of average strength.

SUMMARY OF THE INVENTION

It is, therefore, the principal object of this invention to provide a combination trenching and edging system.

Another object of this invention to provide an edging having readily variable digging depth adjustment capability.

Another object of this invention to provide a combination trenching and edging system having improved steerability during use.

Yet another object of the present invention is to provide an improved edging blade design.

Still another object of the present invention is to provide a edging blade which, during use, defines a groove in the soil for receiving conduit, tubing, wire, or the like.

Another object of the present invention is to provide an edging blade having self-sharpening cutting edges.

A further object of the present invention is to provide an edging blade which forces soil outwardly from the blade during use.

A still further object of the present invention is to provide a trenching machine and a method for digging a trench, laying conduit wire, cable or the like in the trench, and backfilling the trench after laying the wire or cable, all in a single pass.

A further object of the present invention is to provide a trenching machine and an edging machine which are of relatively light weight.

Still another object of the present invention is to provide a trenching machine and an edging machine which are of compact size.

Yet another object of the present invention is to provide a trenching machine having an extendable handle which allows the trenching machine to be made compact enough to fit in the trunk of an ordinary sedan.

A still further object of the present invention is to provide an edging machine having an extendable handle which allows the edging machine to be made compact enough to fit in the trunk of an ordinary sedan.

Yet another object of the present invention is to provide an edging machine which may be readily locked in an upper position, or alternatively, in a lowered, edging position.

A still further object of the present invention is to provide a trenching blade with improved digging performance.

Generally, the present invention includes a trenching and edging system which is portable, and operable by a single user. The present invention includes a soil bed edge-forming machine, having a frame and a motor and wheels connected to the frame. A digging blade is drivingly connected to the motor, and a digging depth adjustment member is connected to the digging blade, with the adjustment member being rotatable for allowing selective digging depth adjustment of the digging blade into the soil.

More specifically, the trenching and edging machine of the present invention includes steerable casters mounted on the rear of the machine which, together with a single front wheel, allow for a tight turning radius when using the machine, thereby facilitating maneuverability of the machine. The machine also includes a blade height adjustment which allows the trenching blade or edging blade height, and, accordingly, the digging depth, to be readily adjusted in substantially infinite variation between the raised and lowermost position. The machine is further capable of digging a trench, laying wire, cable, tubing, etc., and backfilling the trench in a single pass.

Another feature of the machine is a edging blade which includes spring steel digging fingers having carbide tips. As the edging blade is used, it forms a generally-perpendicular wall adjacent the edge of the bed and mounds the dirt towards the bed in an outwardly angled, tapered fashion, opposite the generally-perpendicular wall. At the base of the wall, adjacent the mounded dirt, a groove is formed which is generally below the elevation of the mounded dirt. This groove can be used for the laying of cable, herbicide, pesticide, and/or fertilizer lines, irrigation lines, radio or invisible fencing for pets, etc.

Moreover, the present machine includes a blade guard system which covers the trencher blade regardless of the digging depth of the trencher blade and which also covers the blade when the blade is in the fully raised state, such as would be the case when the machine is being transported.

Another aspect of the present invention includes an edging machine and a trenching machine, both being of a compact design. Both include an extendable handle which, in a preferred embodiment retracts, or folds, to allow for the volume of space occupied by the machines to be minimized, preferably, to the extent that either of such machines can be carried in a trunk of a standard automobile. Further, each of the machines are relatively lightweight, and preferably weigh less than 100 pounds, which allows them to be loaded into, and removed from a vehicle with two, and perhaps just one person.

The trenching machine, which may also function as a device for laying cable, tubing, wire, or other similar elongated material, and includes a trenching blade designed for the compact nature of the machine.

With respect to the edger, a locking mechanism is provided which allows for the machine to be readily lowered to a locked, edging position, and then, through actuation of the locking mechanism, allows the edger to be moved from the edging position, and locked into a raised, or transport, position. This facilitates transport of the edging machine over the ground or other surfaces.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which:

FIG. 9A is a partial side elevational view illustrating blade height adjustment configuration of the trenching and edging machine, illustrating a trenching blade in a raised position;

FIG. 24 is a perspective view of another alternate embodiment of the present invention, and shows a trenching machine, which can also be used for laying cable, wire, tubing, conduit, or the like;

DESCRIPTION OF THE PREFERRED EMBODIMENT

Figure 1:
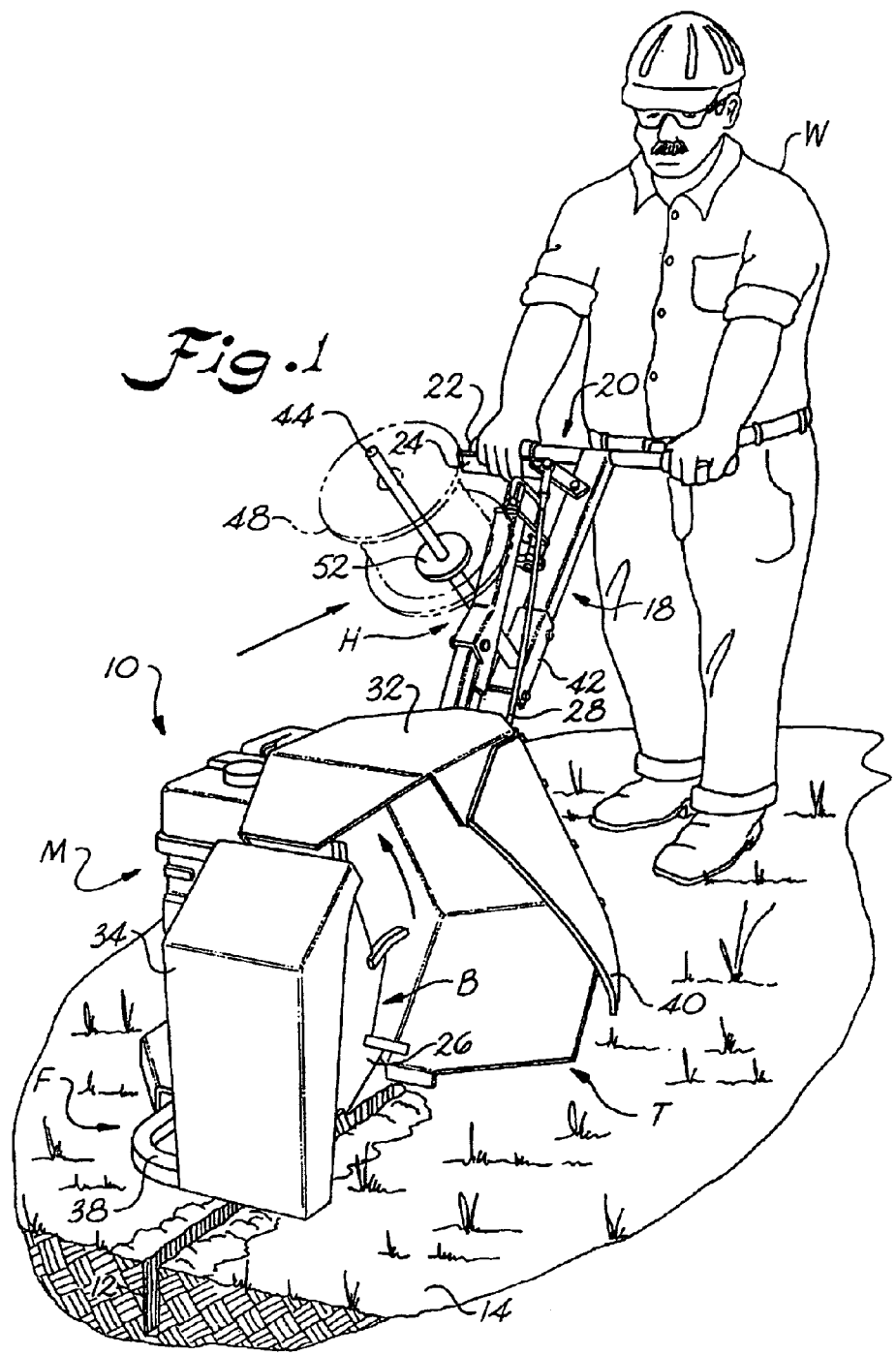
FIG. 1 is a perspective view of a trenching and edging system constructed in accordance with the present invention, illustrating the trenching and edging machine in use digging a trench.

The accompanying drawings and the description which follows set forth this invention in its preferred embodiment. However, it is contemplated that persons generally familiar with earth working equipment will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the trenching and edging system of the present invention is indicated generally in the figures by reference character 10.

Turning to FIG. 1, the trenching and edging system 10 is shown in use as a trencher T. The user, or worker W is pulling the machine 10 rearwardly in order to form a trench 12 in the ground 14. Machine 10 includes a frame, generally F, and a motor, generally M, connected to the frame F. Extending upwardly from frame F is a handle support arm 18, to which a handle 20 is attached. Grips 22 are provided on the handle for grasping by worker W.

A drive lever 24 is pivotally connected to handle support 18, the drive lever being pulled towards handle 20 by worker W when it is desired to engage the digging blade, generally B, which in FIG. 1 is shown as being a trenching blade 26. The pulling of drive lever 24 by worker W causes a corresponding pulling of cable 28 which in turn engages a drive transmission, generally 30, more clearly shown in FIGS. 2 and 5.

Also shown on FIG. 1 is a blade height/depth adjustment assembly, generally H, which will be discussed in more detail below.

Machine 10 includes shroud 32 and guard 34, which are connected to frame F. Shroud 32 and guard 34 serve to cover trenching blade 26 during operation and during transport, primarily for safety purposes. Note that guard 24 is connected to frame F via a support bar 38. A flexible guard 40 is attached to shroud 32 for deflecting rocks, dirt, or other underground buried objects which may be unearthed and thrown upwardly by trenching blade 26 during use. Flexible guard 40 could be constructed of rubber, plastic, or some other residual material.

Attached to handle support 18 is a bracket 42 which supports a spool axle 44 for carrying a spool 48 of wire, conduit, cable, drip line, tubing, or the like when machine 10 is used for laying and burying same. The spool axle 44 includes a flange 52 on which spool 48 rests during use. Operation of machine 10 for burying such wire, cable, tubing, etc. will be discussed further below.

Figure 2:
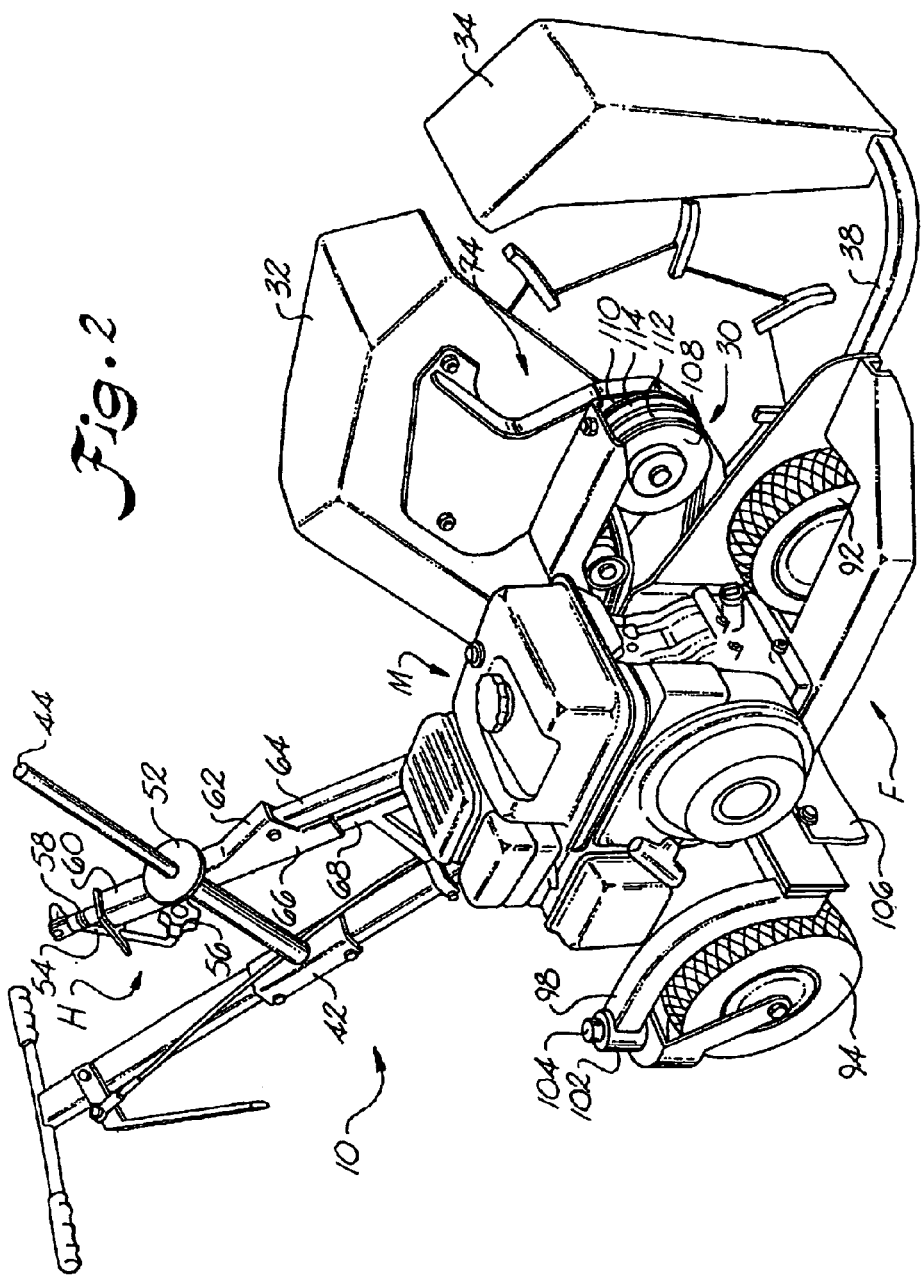
FIG. 2 is a perspective view of the trenching and edging machine of the present invention.

FIG. 2 illustrates the left side of machine 10 and the blade height adjustment configuration H in more detail. The mechanism H includes a crank arm 54 having a knob 56 rotatably connected to a threaded shaft or rod 58. The shaft 58 extends through a tower 60 which includes a first collar 62 for receiving a pivotal link 64 and a second collar 66 for receiving a stationary link 68. Collar 66 is configured for sliding movement relative to stationary link 68 when crank arm 54 is turned by knob 56 by the user.

Figure 7:
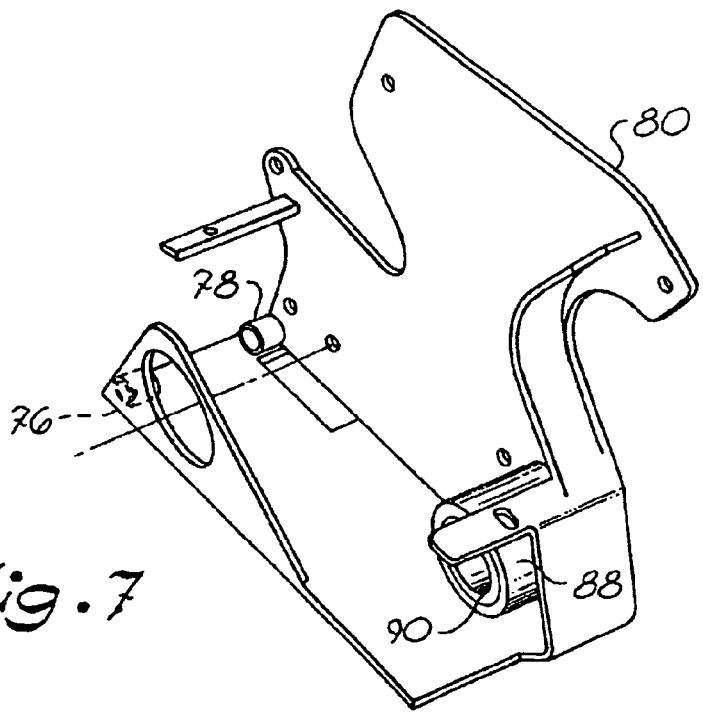
FIG. 7 is a perspective view of a bracket for the trenching and edging machine for carrying a blade for the machine.
Figure 8:
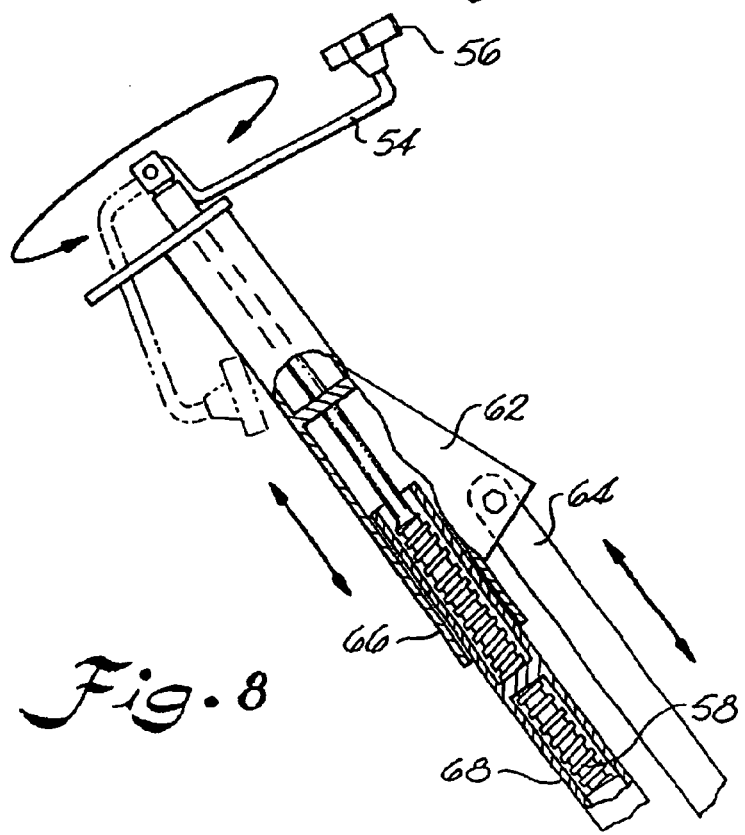
FIG. 8 is a partial perspective view, with parts cut away, of the blade height adjustment configuration of the trenching and edging machine.

As shown in more detail in FIGS. 6 through 9B, as crank arm 54 is turned, collar 66 moves upwardly or downwardly, depending on the direction of rotation of crank arm 54 with respect to stationary link 68. This causes the upper end of pivotal link 64 to pivot with respect to collar 62 and the lower end 70 of pivotal link 64 to pull upon or push on a shaft 72. Shaft 72 is connected to a bracket arrangement, generally 74, which carries the transmission, or blade drive mechanism, 30 having digging blade B. Shaft 72 is carried in bosses 76, 78 which are fixedly connected to a bracket 80. Bracket 80 includes an opening 82 for receipt of the drive shaft 84 of motor M, such opening also extending through a corresponding bracket 86 fixedly attached to frame F. Accordingly, rotation of crank arm 54 as shown in FIG. 8, advances threaded rod 58 upwardly or downwardly, which in turn causes pivotal link to pivot bracket arrangement 74, thereby raising or lowering the digging blade B.

FIG. 7 illustrates bracket 80 in further detail, and bracket 80 includes boss 88 which carries a bushing 90 for drive shaft 84 (FIG. 5) for driving the digging blade.

Figure 9B:
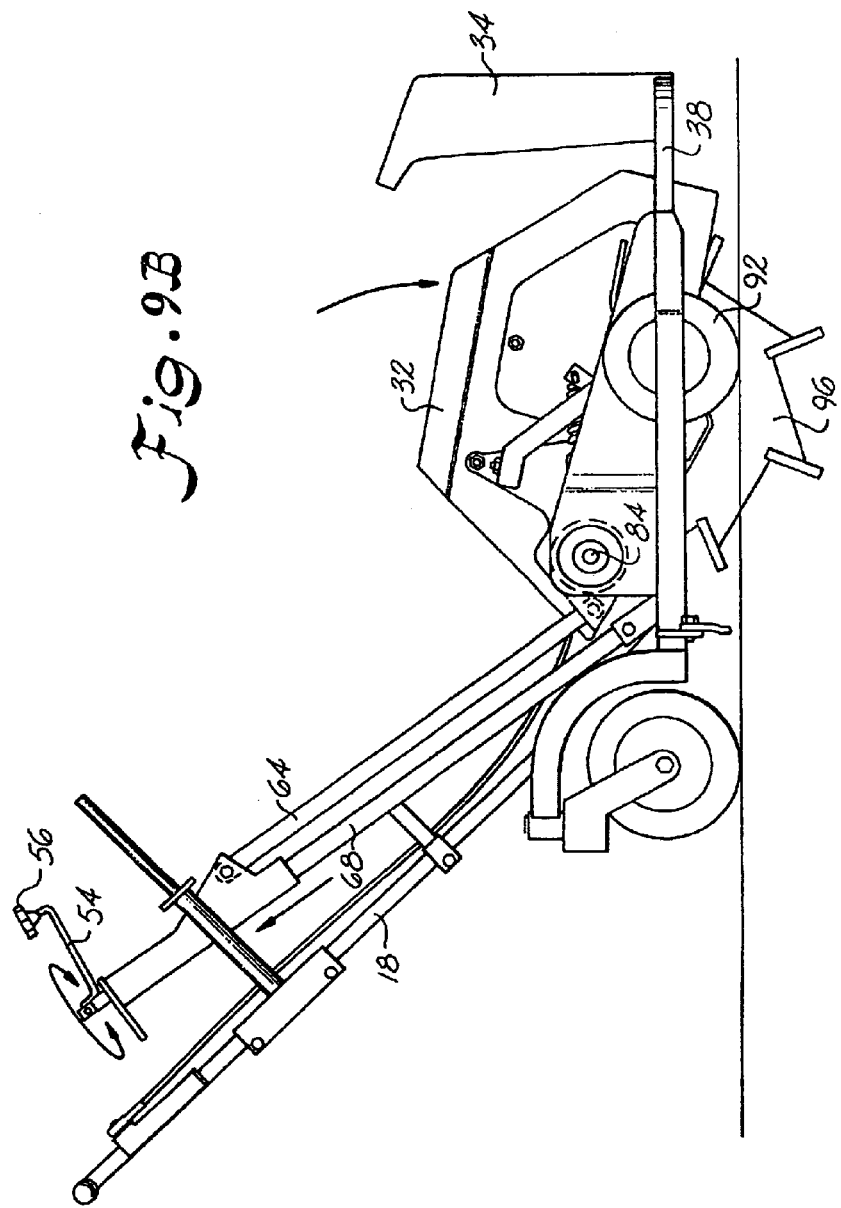
FIG. 9B is a partial side elevational view of the trenching and edging machine, illustrating the trenching blade in a lowered position.

FIG. 9A shows the digging blade B raised to its uppermost position. Note the position of pivotal link 64 and the upward incline of shroud 32. FIG. 9B illustrates the blade in the lowered digging position, and note the relative position for the lower portion 70 of pivotal link 64 with respect to the bracket 80 which attaches stationary link 68 to frame F.

Figure 3:
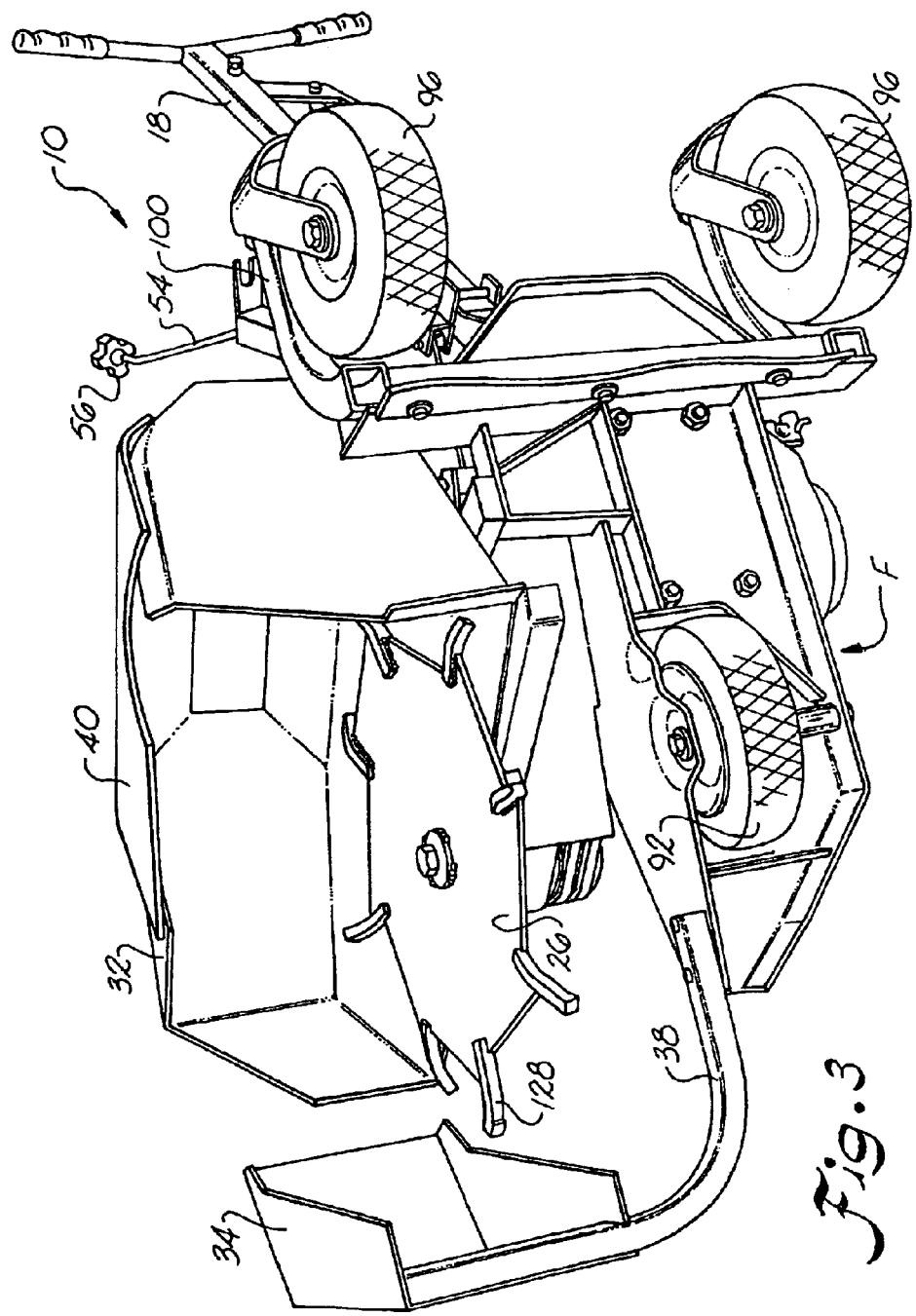
FIG. 3 is a bottom perspective view of the trenching and edging machine constructed in accordance with the present invention.

Returning to FIG. 2, machine 10 includes a single front wheel 92 and two rear wheels 94, 96 (FIG. 3). Rear wheels 94, 96 are caster wheels and freely pivot with respect to frame F. Curved support arms 98, 100, connect the rear wheels to the frame F, and support arms 98, 100, and include bosses 102 through which pivot axles 104 of wheels 94, 96 extend.

A downwardly extending flexible guard 106 is provided on the underside of frame F to further catch and minimize throw-back of objects onto worker W during use. Bracket arrangement 74, discussed above, can be seen from another perspective in FIG. 2, and serves to shroud driven pulleys 108, 110, which connect via two drive belts 112, 114, to two drive pulleys 116, 118 (FIG. 5) connected to the output shaft 84 of motor M. It is noted here that motor M is shown as a gasoline-powered motor, and in a one preferred embodiment is a six (6) horsepower. Briggs and Stratton Vanguard engine. An idler pulley 120 is also carried within bracket 80, and will be discussed in further detail below. Shroud 32 attaches to a bracket 122 via bolt and nut combinations, generally 124.

FIG. 3 is a view of the bottom of machine 10 and illustrates the construction of frame F and the attachment of support bar 38 to frame F. Support bar 38 carries guard 32, which extends in front of trenching blade 26. Trenching blade 26 includes outwardly-extending digging fingers 128, and trenching blade 26 is bolted to an axle 130 (FIG. 5) connected to drive pulleys 116, 118. Note that rear wheel 96 is spaced outboard of trenching blade 26 in order to maintain the stability of machine 10 during use.

Figure 4:
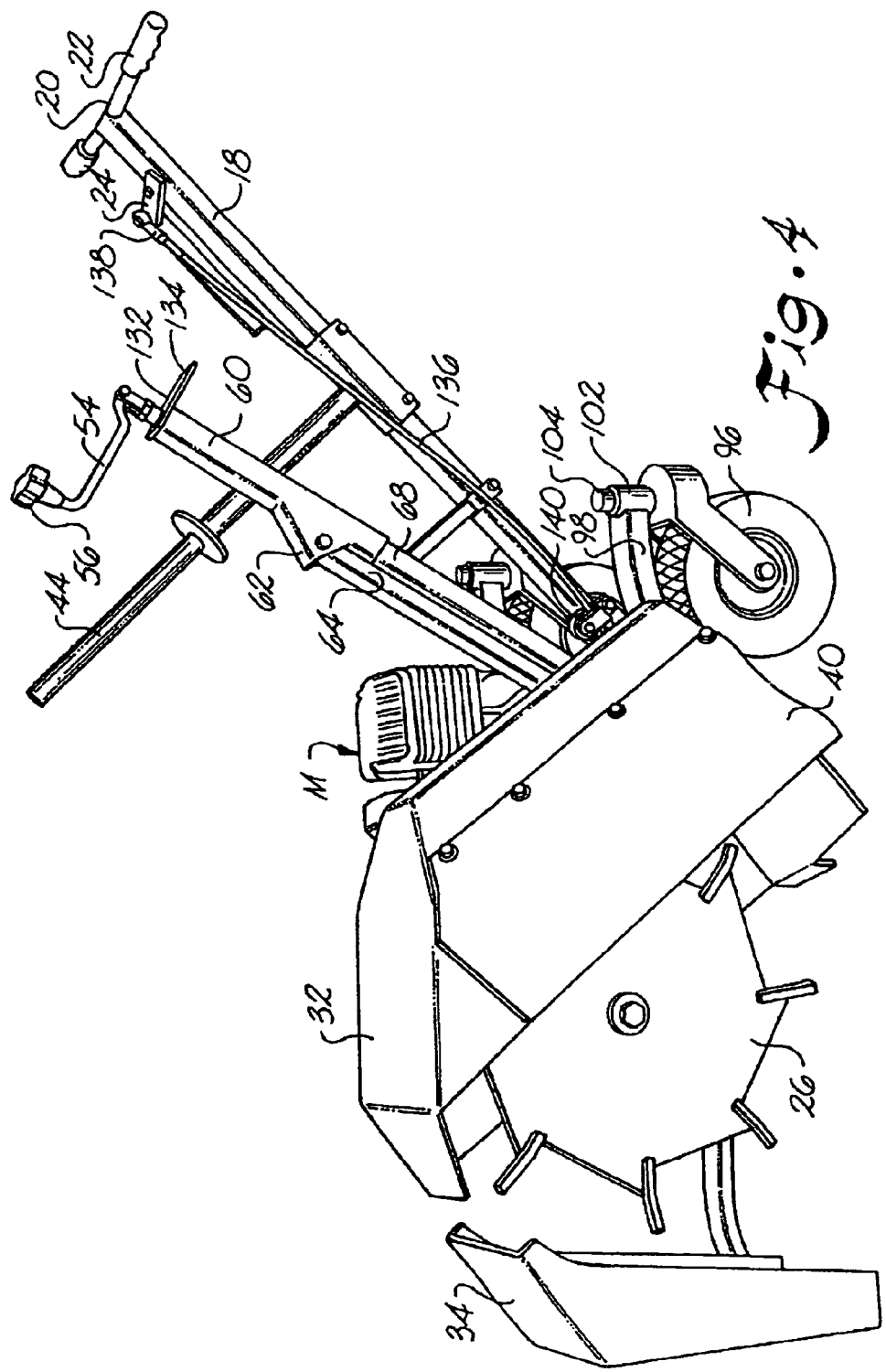
FIG. 4 is a left side perspective view of the trenching and edging machine constructed in accordance with the present invention.

FIG. 4 illustrates crank arm 54 pivoted outwardly in a position for turning by knob 56. A bracket 132 is provided with a retaining hole 134 for holding crank arm 54 and preventing it from rotating during use. This maintains the digging height of the blade once adjusted with crank arm 54.

FIG. 4 also illustrates cable 136 extending downwardly from drive lever 24. Cable 136 is connected to drive lever 24 via a pivotal connector 138, and cable 136 passes beneath a guide roller 140, which is attached to handle support arm 18.

Figure 5:
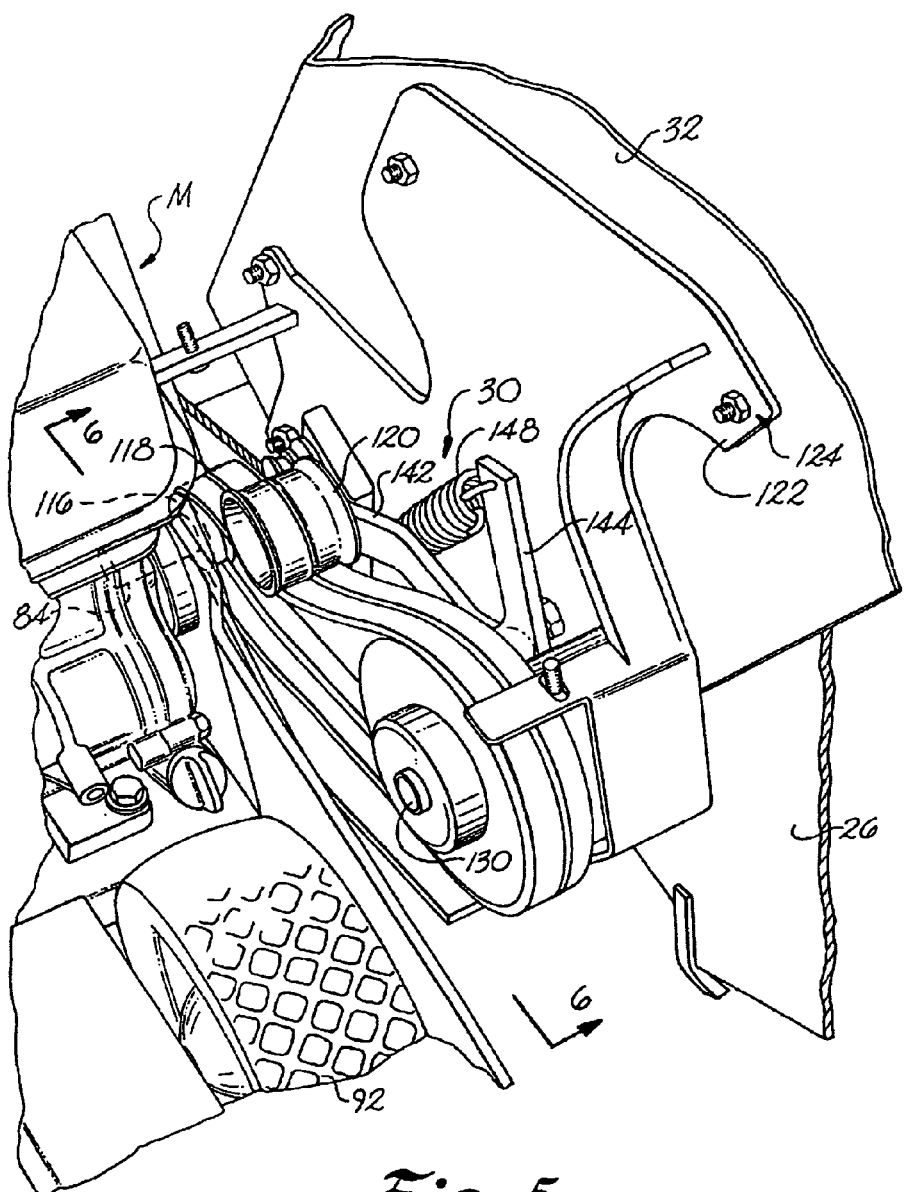
FIG. 5 is a partial perspective view of the blade drive configuration of the trenching and edging machine illustrated in FIGS. 1 through 4.
Figure 6:
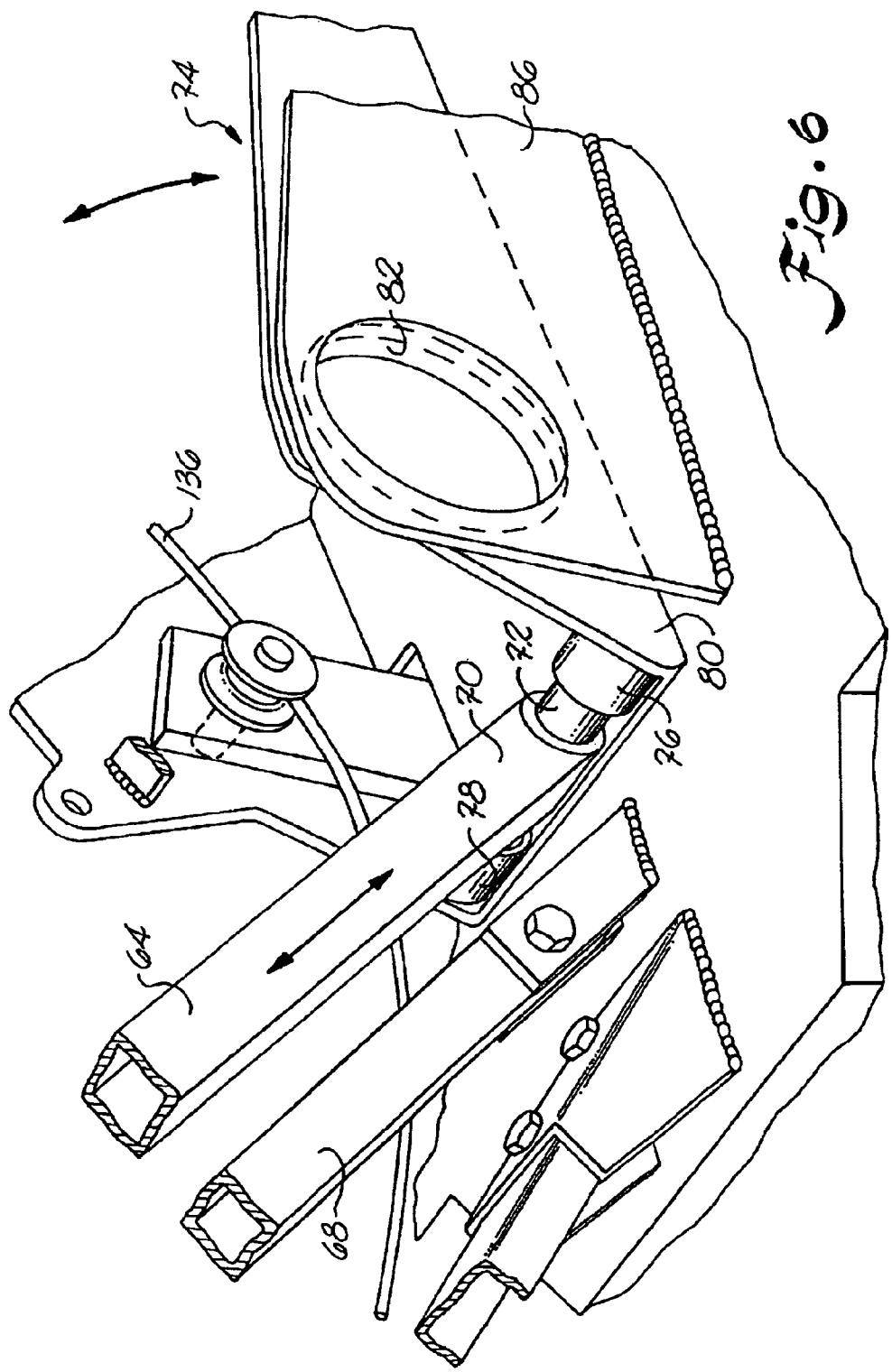
FIG. 6 is a partial perspective view taken along lines 6—6 of FIG. 5.

Cable 136 extends from guide roller 140, as shown in FIG. 5, and terminates in a driving engagement member 142, which includes and upstanding arm 144 and idler pulley 120. A return spring 148 is also attached to arm 144. Return spring 148 is attached at its other end to cable 136. When drive lever 24 is pulled towards handle 20, cable 136 is tightened. This pulling of the drive lever is performed against the tension force of return spring 148, and the pulling of cable 136 causes member 142 to pivot, which in turn forces idler pulley downwardly against drive belts 112, 114, thereby causing them to snuggly engage pulleys 108, 110, 116, 118. This in turn causes the rotation of motor output shaft 84 to drive pulleys 116, 118, to therefore drive the digging blade. Drive lever 24 acts as a "dead man" control, such that should worker W release drive lever 24, idler pulley 120 retracts, thereby causing slack to be formed in drive belts 112, 114, and the driving of digging blade B ceases. FIG. 5 illustrates idler pulley 146 in driving engagement with the drive belts.

Figure 9C:
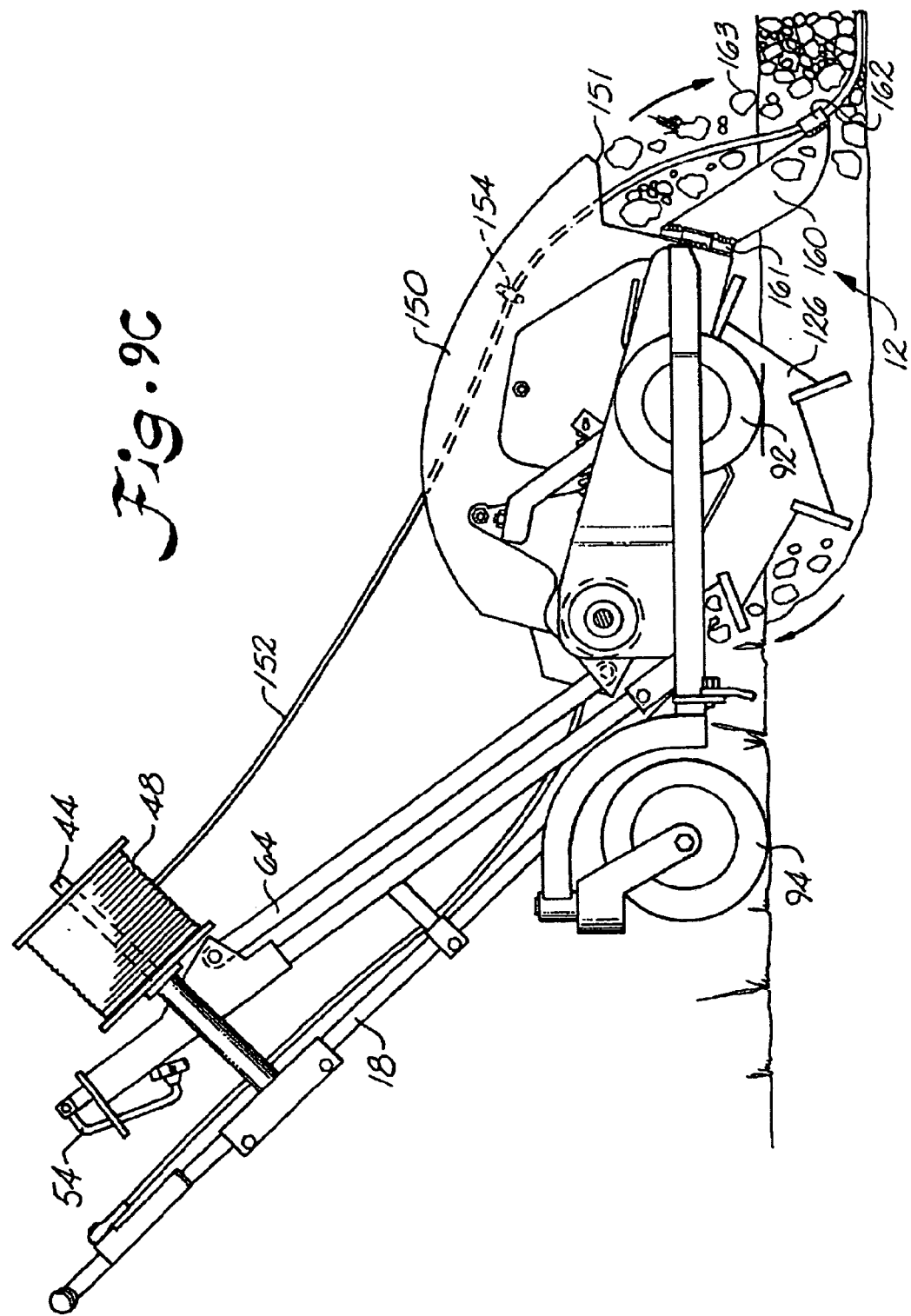
FIG. 9C is a partial side elevational view illustrating the trenching and edging machine in the present invention simultaneously digging a trench, laying cable, wire, tubing, etc. and backfilling the trench.
Figure 10:
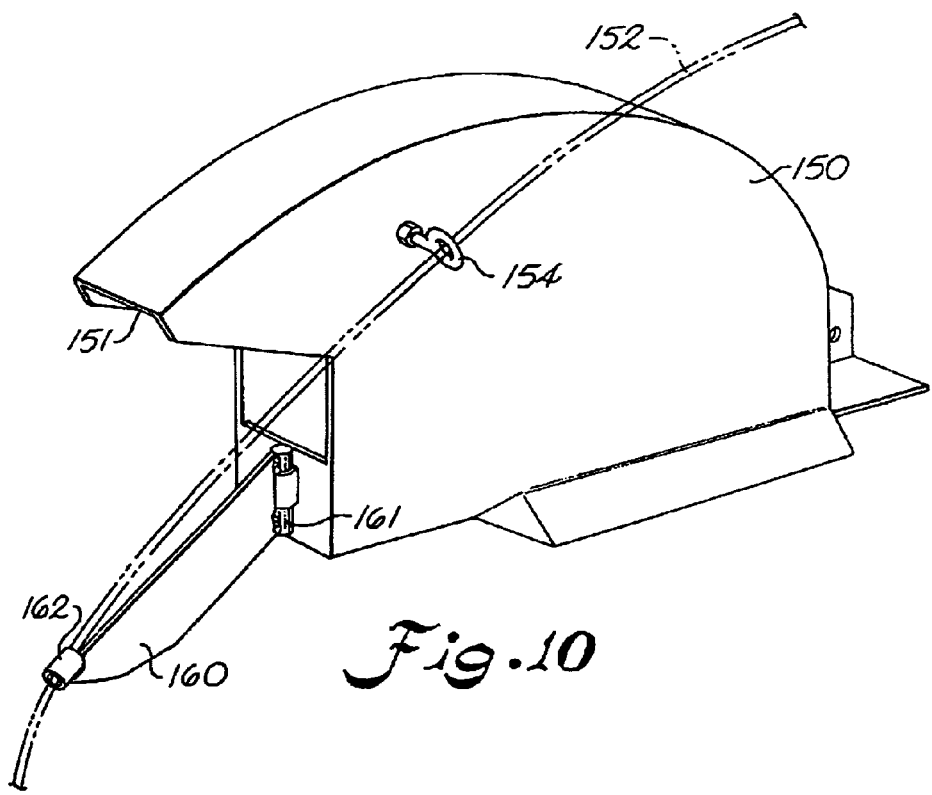
FIG. 10 is a perspective view illustrating a hood for use in connection with the trenching machine for guiding and placing cable, wire, tubing, etc. within a trench.

FIGS. 9C and 10 illustrate use of machine 10 as a trenching, cable, tubing, wire, etc. laying, and backfill machine. This is one of the three major functions of the present invention. Use of machine 10 as a trenching machine has been discussed above. Trenches formed by such machine would be useful in laying sections of rigid pipe, for example, which are not flexible or of small enough diameter to be carried on a spool. However, where it is desired to lay cable, tubing, wire, etc. which is capable of being carried on a spool, then machine 10 can be used to dig a trench, lay such item and bury it all in a single pass. In this configuration machine 10 includes a hood 150 which attaches to frame F and which replaces shroud 32. Hood 150 has a delivery chute 151 for returning soil which is being dug by trenching blade 26 back into the same trench. In the interim, however, an elongated member 152 such as pipe, cable, tubing, wire, drip line, pays out from spool 48 and is placed within the trench 12. The elongated member 152 passes from spool 48 to an eyelet, or guide 154 carried on hood 150. The elongated member then extends downwardly towards the trench, but first passes through a pivotal foot 160 which is pivotally connected to a front portion of hood 150 in a hinge-like configuration 161. At the lowermost portion of foot 160, a second guide 162 is carried through which the elongated member 152 passes. Foot 160 is allowed to pivot from side to side to accommodate for irregularities which may be found in the trench as the trench is dug. As the foot directs the elongated member to the lower portion of the trench, backfill soil 163 is simultaneously being delivered from the delivery chute 151 of hood 150 to backfill the trench, and, accordingly bury the elongated member 152.

Figure 11:
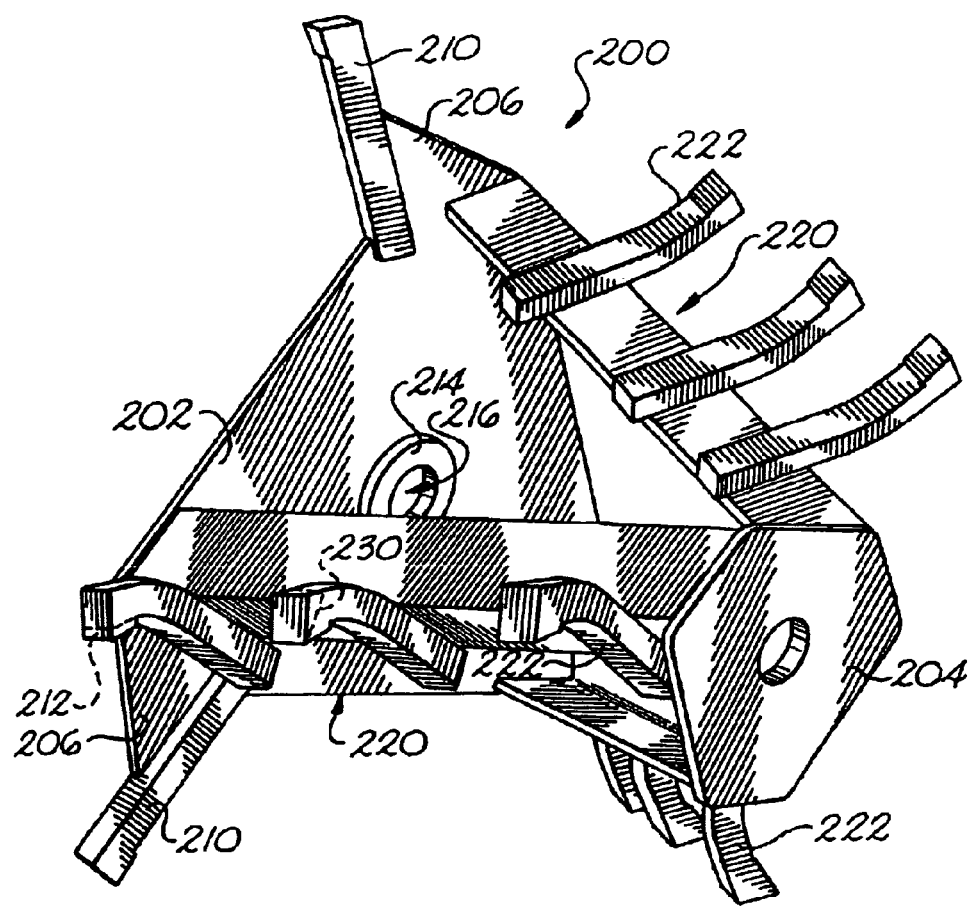
FIGS. 11 through 13 are perspective views of an edging blade constructed in accordance with the present invention.
Figure 12:
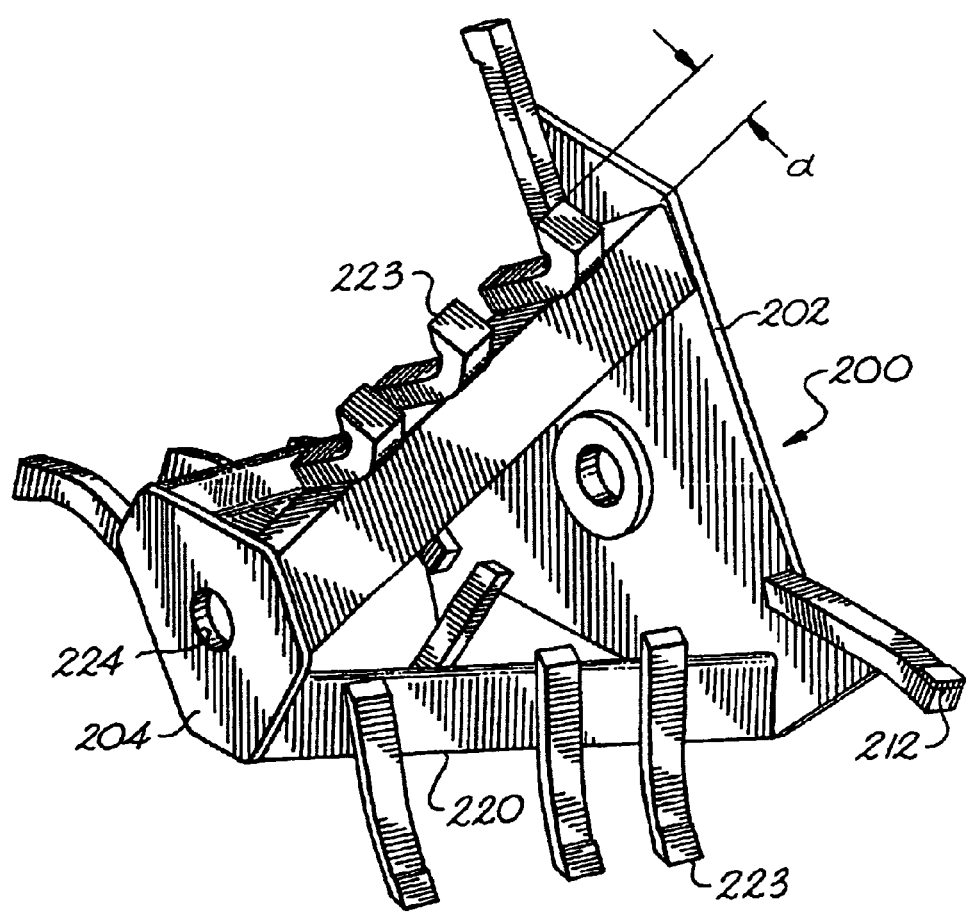
Figure 13:
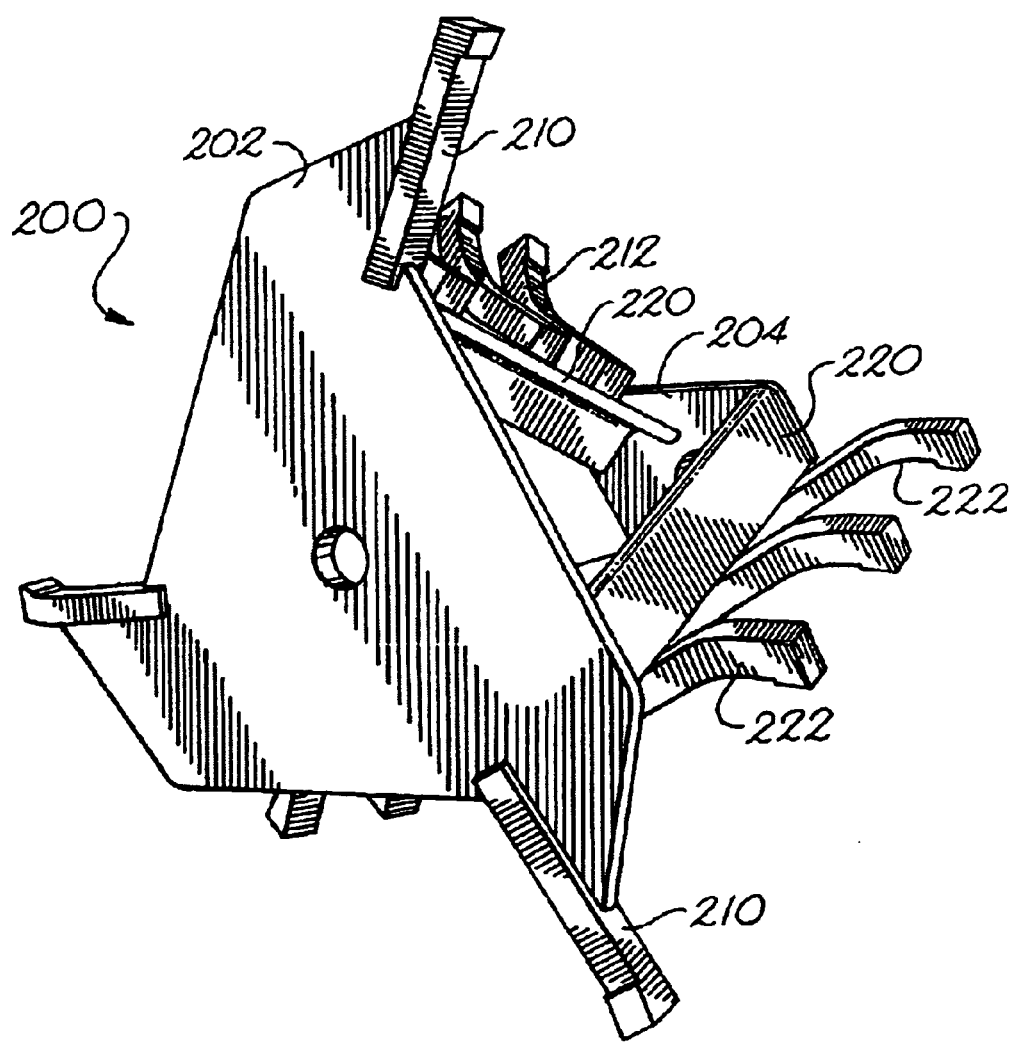

FIGS. 11 through 13 illustrate a bed edging blade 200 of the present invention. Machine 10 can be provided with the trenching blade 26, as discussed above, or other suitable digging blades (not shown), the bed edging blade 200, thereby rendering machine 10 as capable of performing three functions, namely, (a) trenching; (b) trenching, laying, and backfilling; and (c) edging of beds.

Edging blade 200 is in overall shape is generally similar to a pyramid or cone and includes a base plate 202, and an end plate 204. Base plate 202 is of a generally triangular shape, but includes three brace, or gusset, portions 206 which extend outwardly behind each of three base digging fingers 210. Digging fingers 210 are preferably constructed of spring steel and preferably include at the ends thereof carbide cutting blades 212. Digging fingers 210 are preferably welded to base plate 202, which is in one preferred embodiment, made for mild steel. Base plate 202 includes a boss 214 which defines an axle opening 216 for receiving the drive axle 84 of drive pulleys 116, 118. Extending upwardly from base plate 202 and terminating in end plate 204 are three support members, or ribs, generally 220, each of which are substantially equidistantly spaced apart from one another and acutely angled with respect to base plate 202. These support members 220 are preferably constructed of steel and have an angled cross-section. Each support rib carries three digging fingers 222.

Turning to FIG. 12, these digging fingers 222 are inwardly curved along their respective lengths. Each digging finger preferably includes a carbide tip or blade 212 at the end thereof. The leading edge 223 of each carbide tip is preferably substantially parallel to the support rib on which it is carried, as shown by arrows a. In other words, the angle of the leading edge of a digging finger with respect to base plate 202 is acute and is substantially the same acute angle as formed between the support rib 220 on which such digging finger 222 is carried and base plate 202.

End plate 204 includes an opening 224 for allowing a socket wrench extension (not shown) to pass therethrough when edging blade 200 is attached to axle shaft 84 through use of a nut 226.

The above-described construction of edging blade 200 provides certain advantages. First, as the edging blade is used, the outboard corner 230 (FIG. 11) of each digging finger 222 tends to hit the soil first during use and accordingly becomes worn down, such as shown in phantom in FIG. 11. This ultimately causes a sharpening effect of the digging finger, and as wear of a tooth advances, continues to maintain the extreme ends of the digging fingers sharp. In essence, the digging fingers become generally self-sharpening.

Another advantage of the above construction is that because the digging fingers 222 are angled outwardly with respect to base plate 202, i.e., the leading edge 223 of a digging finger 222 does not approach the soil precisely parallel to the soil surface. This causes the leading edge 223 to thus pierce, or shear, the soil incrementally as the lowermost portion of the finger first hits the soil and then the remainder of the leading edge 223 contacts the soil thereafter. This cutting action has been analogized to how scissors operate in that the entire cut to be made in a piece of paper, for example, by a pair of scissors, does not occur instantaneously, but instead the cut advances as the scissors are closed. This shearing action of digging fingers 222 is believed to provide a better digging action, as the digging fingers are less apt to "beat" or reverberate against the soil surface, since they do not approach the soil surface in a direct parallel relationship. The shearing action of the angled digging fingers 222 is also believed to improve use of the edging blade on hard soil, since a direct parallel approach of the digging fingers would likely cause more vibration and perhaps a "bouncing" of the digging fingers on such hard soil surface.

A further advantage of the leading edges of the digging fingers being angled outwardly with respect to the base plate 202, is that such angling of the digging fingers causes an augering effect of the soil as the blade is used. This augering effect tends to propel the soil away from the base plate 202, thereby building a desirable mound angled outwardly and tapered into the edge of the bed being worked. This also provides for a cleaner vertical wall, which is dug by base plate 202 and the base plate digging fingers 210. The angled support ribs 222 tend to further provide an augering effect, also forcing the soil upwardly on the bed mound.

Figure 14:
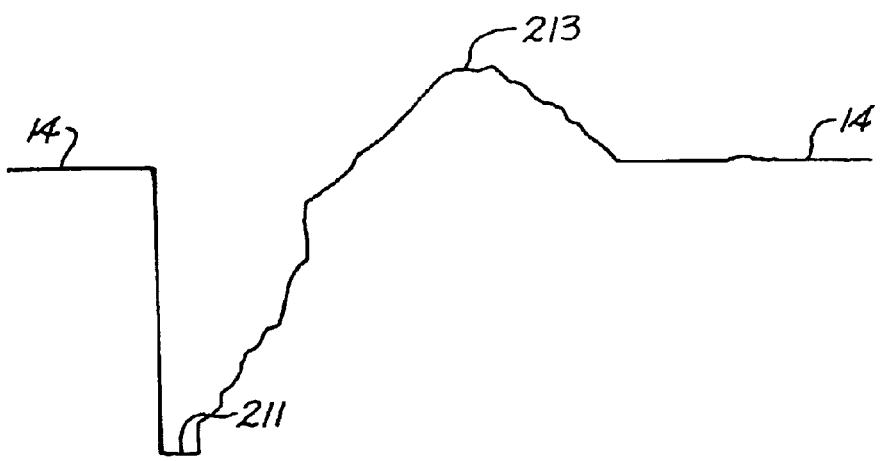
FIG. 14 is a simplified view of a bed edge having a groove in the soil below the depth of the bed edge formed using the edging blade of the present invention.

Another significant feature of edging blade 200 is the fact that the base plate digging fingers 210 dig a groove 211 as shown in FIG. 14 extending below the base of the bed edge 213 being constructed. This groove allows for placement and receipt of drip line, which may be used to carry herbicide, fertilizer, pesticide, etc. around the perimeter of the bed. The groove could also be used to bury pet containment system wire, also known as invisible fencing.

By providing the three support ribs on edging blade 200, the digging action of the blade 200 is staggered, as compared to prior art digging blades having two diametrically-opposed digging blade structures. This allows for a smoother operation and also staggers the cutting action of the blade, allowing for more continuous cutting action. This is expected to allow more digging capability for the same amount of horsepower motor as has been used in the past.

Further, with regards to the base plate digging fingers 210, such fingers are effectively reinforced and supported along their length by the gussets 206 of base plate 202. These gussets support the back side of each base plate digging finger, to thereby strengthen and prolong the life of such digging fingers.

The earth-working machine 10 of the present invention thus provides a versatile system for digging trenches, burying tubing, conduit, wire, etc., and also for forming edges of beds in the soil. As the machine is relatively small, and portable, it can be used in situations where bigger machines would not be appropriate, and also, because of its relatively small size, is less destructive on lawns, turf, etc., than would be certain larger machines.

Machine 10 is particularly maneuverable for equipment of its type. Another noteworthy feature is the position of the front wheel 92 with respect to the digging blade B, be it the trencher blade 26 or the edging blade 200. As can be best seen from FIG. 9A, as the digging blade is pivoted in an arc from its lowermost position to its uppermost position, the center of rotation thereof remains close to the center of rotation of the front wheel, since the radius of the arc extends only slightly beyond front wheel 92. In other words, whether the axis of rotation of the digging blade is above or below such axis of rotation, the digging blade can be in general vertical alignment with the axis of the front wheel, broadly speaking, and such positioning is sufficient to allow improved maneuverability of machine 10 during operation. Since the axis of rotation of the digging blade is close to that of the front wheel, through use of the steerable caster wheels, and because the front wheel 374 is laterally spaced as closely as practical to the digging blade, relatively tight turns can be made with the machine 10 as it is pulled rearwardly during use.

Another feature of machine 10 is the safety aspect afforded by shroud 32 and guard 34. Shroud 32 and guard 34 are configured to shield the digging blade not only when the digging blade is in its lowered, digging position, but also when it is in its raised, transport position. Furthermore, both shroud 32 and guard 34 can be used with either trenching blade 26 or edging blade 200.

Figure 23:
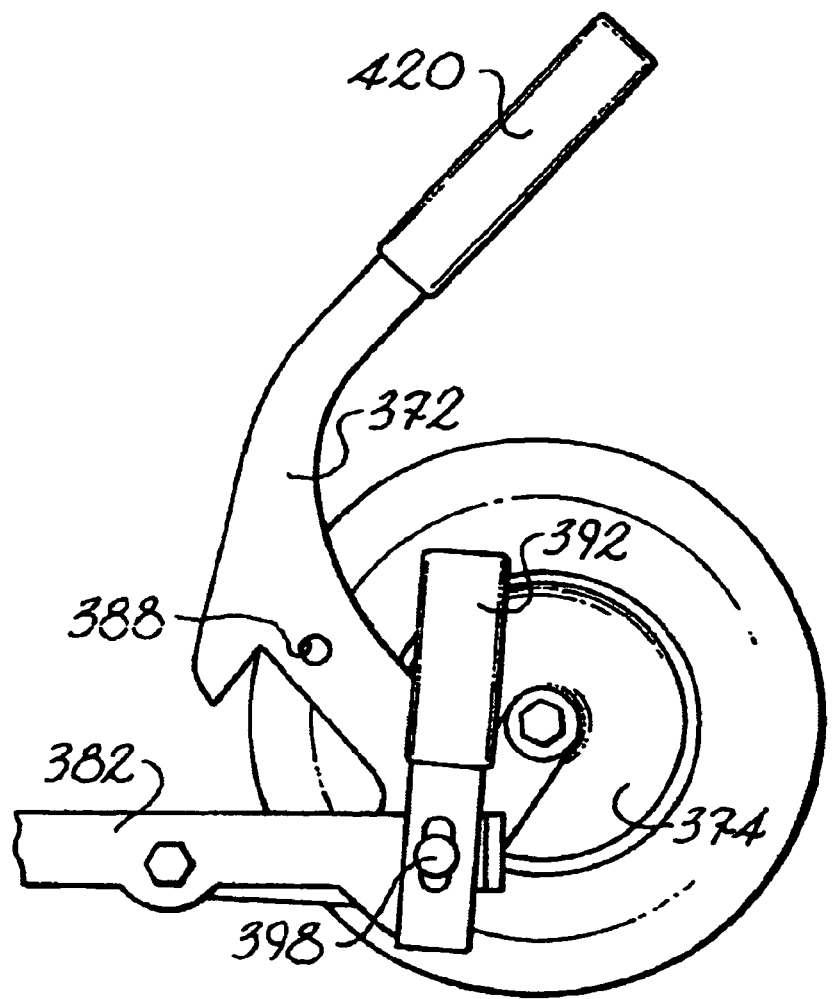
Figure 24:
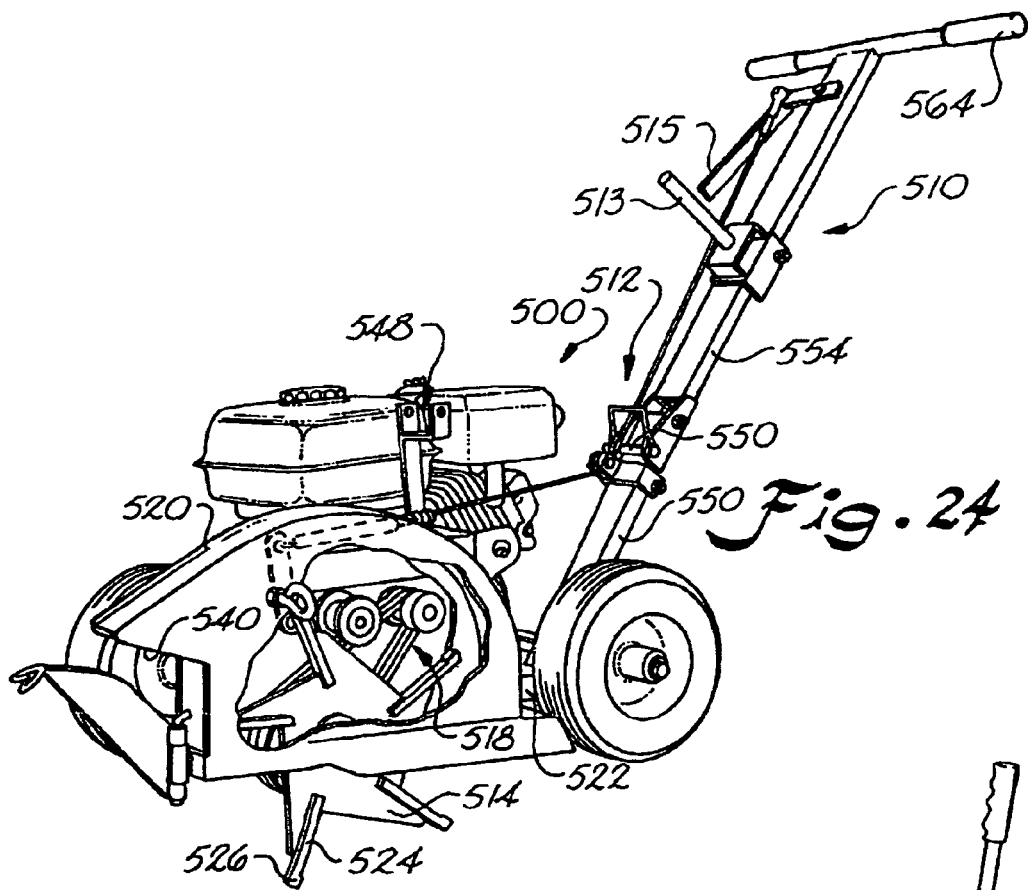
Figure 25:
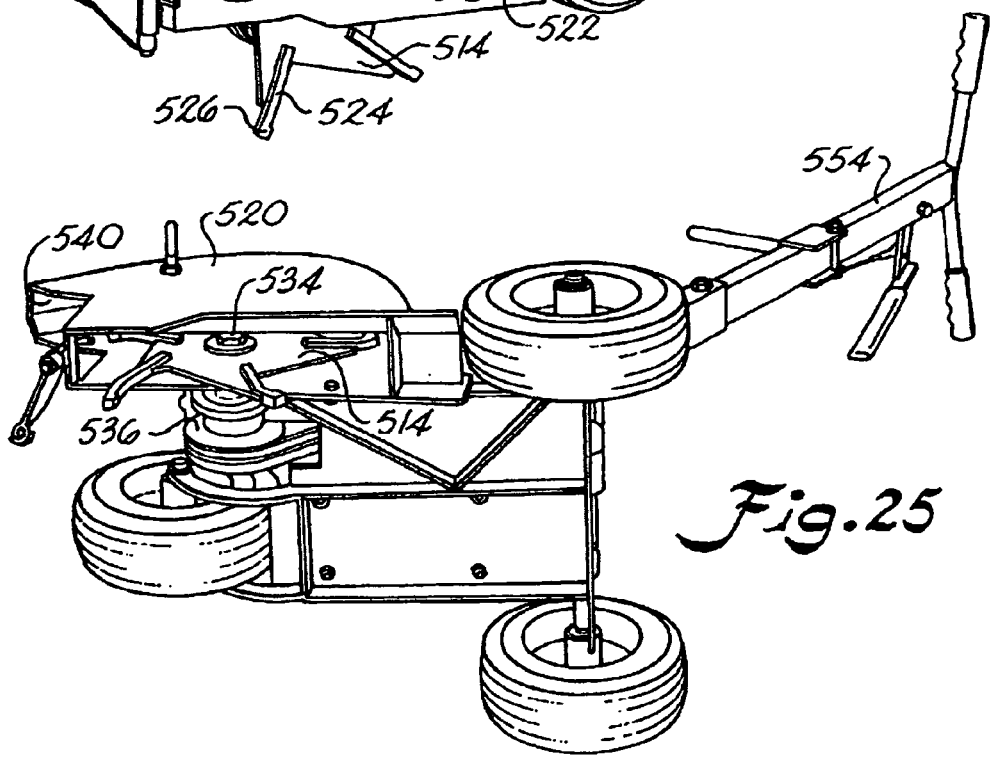
FIG. 25 is a bottom perspective view of the trenching machine illustrated in FIG. 24.

Turning to FIGS. 24 through 23, a compact edger 300 is shown, edger 300 being an alternate embodiment of the present invention. Compact edger 300 is similar to trenching and edging system 10 in a number of aspects. Edger 300 includes a motor 302, which in one preferred embodiment is a 5% horsepower gasoline engine, mounted on a frame 304 and includes drive means, generally 303, such as discussed above for transferring power from motor 302 (which in one preferred embodiment is a 5½ horsepower gasoline engine) to a soil bed edge forming, or "edging," blade 305. Preferably edging blade 305 is similar to blade 200, discussed above. A drive lever 308 is mounted on a handle, generally 310, for engaging and disengaging blade 306 for rotation.

Figure 15:
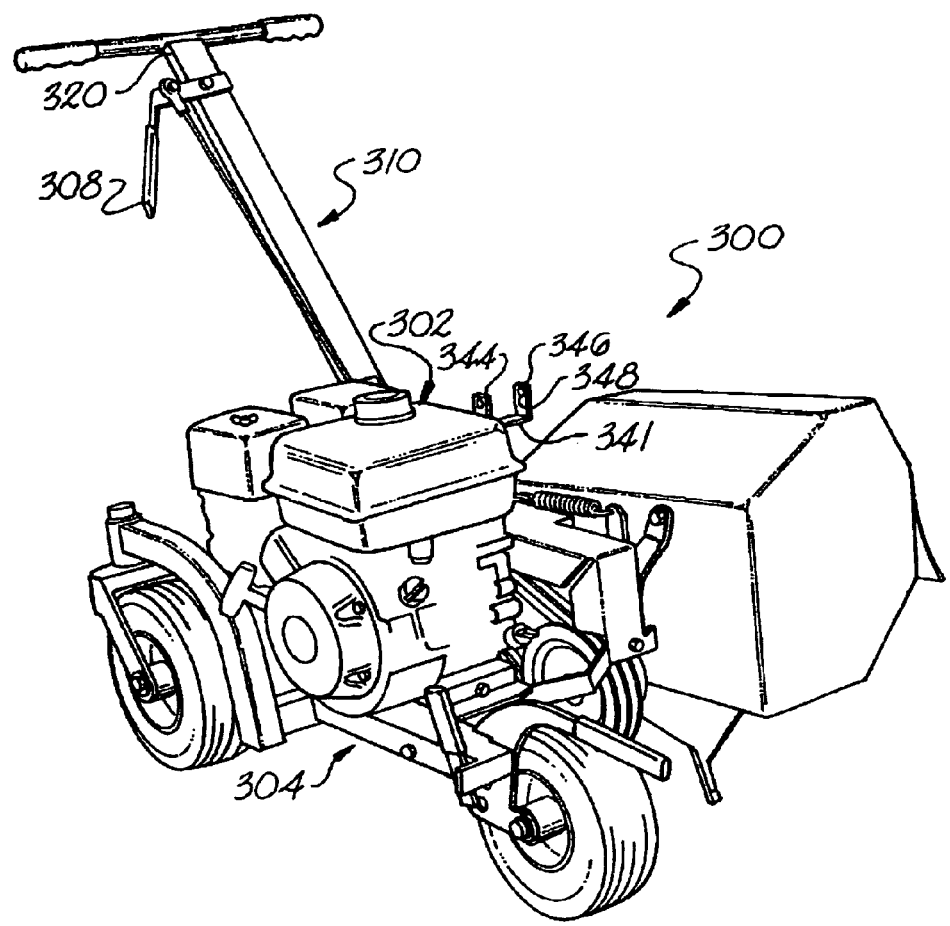
FIG. 15 is a perspective view of an alternate embodiment of the present invention showing a compact edging machine.
Figure 16:
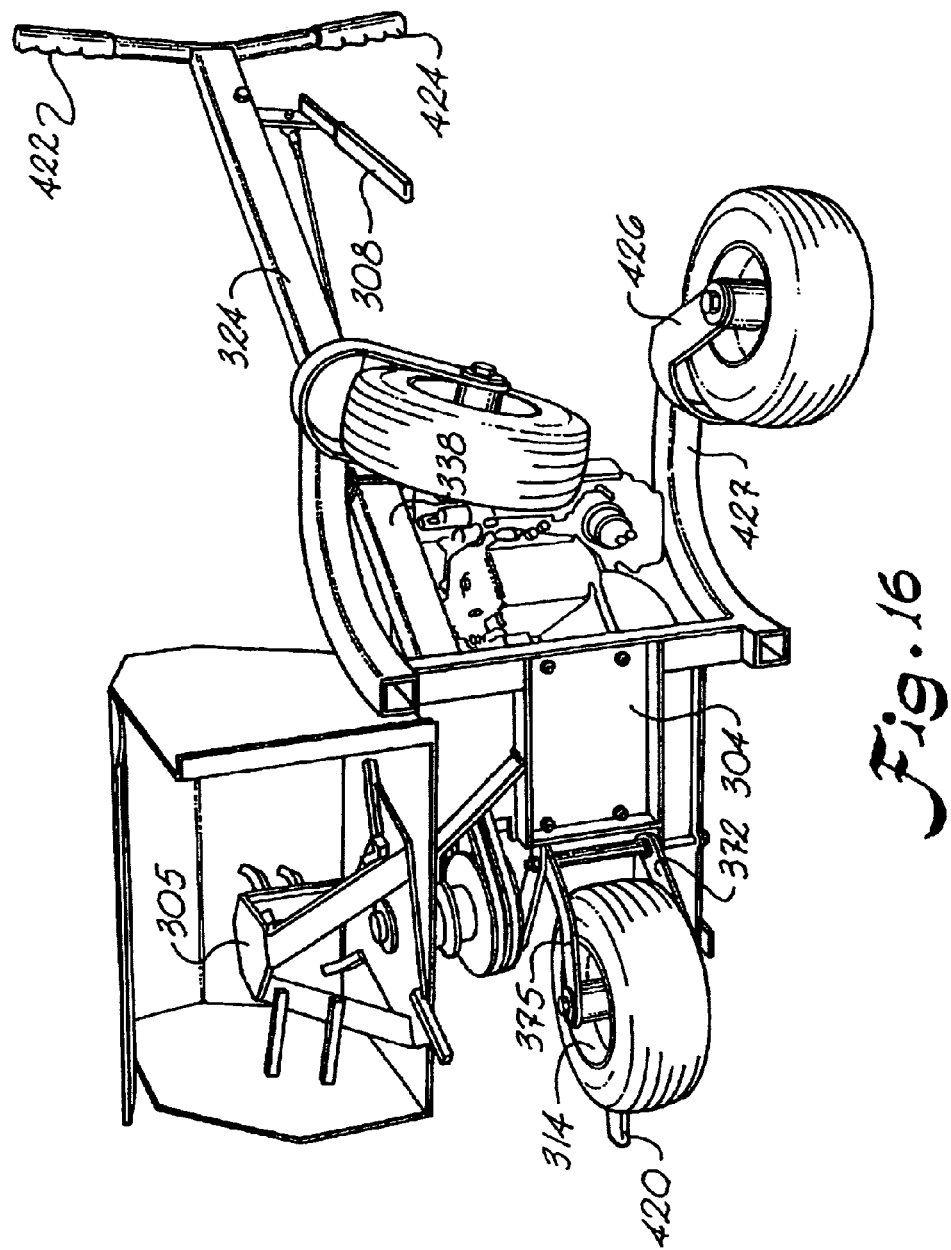
FIG. 16 is a perspective view of the edging machine shown in FIG. 15.
Figure 17:
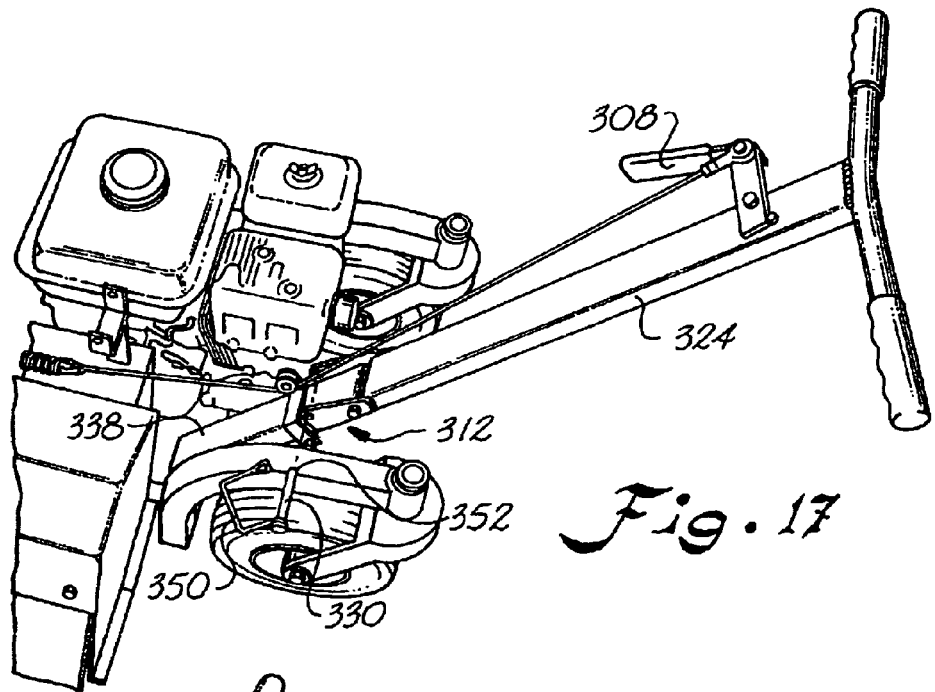
FIG. 17 is a partial perspective view illustrating the edger shown in FIG. 15, wherein the handle thereof is extended.
Figure 18:
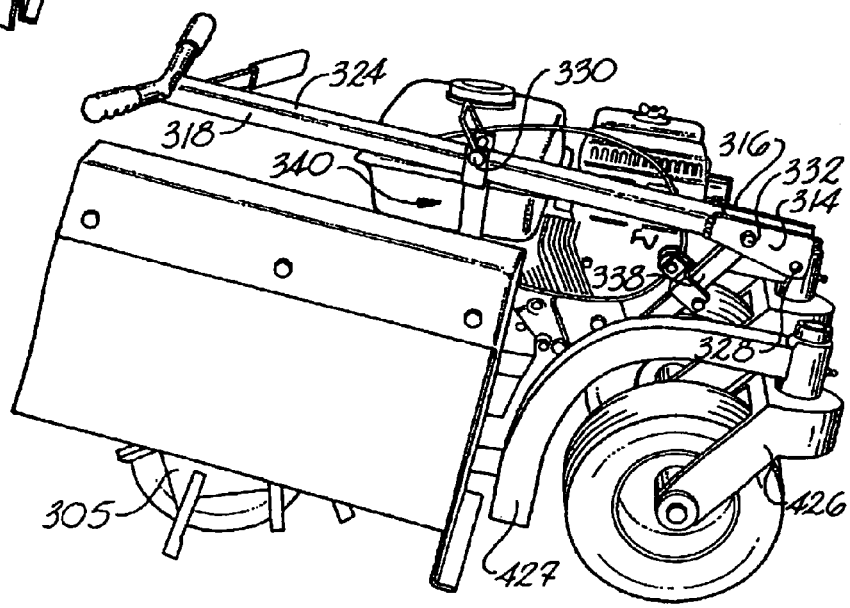
FIG. 18 is a perspective view of the edging machine shown in FIG. 15, wherein the handle is folded, and the edging machine is in a collapsed, compact configuration.

An important feature of edger 300 is the ability of handle 310 to be extendable from a retracted position, such as shown in FIG. 18, to an extended position, such as shown in FIGS. 15, 16, and 17. In a preferred embodiment, handle 310 is foldable for moving between the retracted and extended positions. As shown in FIGS. 17 and 18, a hinge mechanism, generally 312, is provided on handle 310 and includes side plates 314, 316 attached on opposite sides 318 and 320 of an upper portion 324 of handle 310. Each of plates 314, 316 includes a hole 328 for receipt of a handle lock pin 330. A pivot pin 332 passes through plates 314, 316 and lower portion 338 of handle 310. The combination of plates 314, 316 and pin 332 acts as a hinge and allows upper portion 324 of handle 310 to move with respect to lower portion 338. Upper portion 324 of handle 310 is preferably significantly longer than lower handle portion 338, to further reduce the effective height of edger 300 when handle 310 is folded.

Handle 310 may be folded to the retracted position when edger 300 is to be transported or stored. When folded to the retracted position, upper portion 324 of handle 310 is received within a bracket, generally 340, is mounted to frame 304. Bracket 340 includes an upstanding member 342 having a receiver, generally 341, which includes uprights 344, 346. Each upright 344, 346 includes a hole 348 for receiving lock pin 330 when handle 310 is in the retracted position. In the retracted, or folded, position, handle 310 extends near horizontally over and above frame 304. Once handle 310 is in the retracted position, and upper portion 324 of handle 310 is received between uprights 344, 346, lock pin 330 is preferably inserted into holes 348 of uprights 344, 346. Pin 330 can be of conventional design and may include a locking clasp 350 or could be one of various other known pin designs. With the clasp 350 of lock pin 330 engaged around the end 352 of pin 330, pin 330 holds handle 310 securely within uprights 344, 346. This allows handle 310 in its folded position to also be used to assist in lifting edger 300 during loading or unloading, since the upper portion of handle is locked in place in receiver 341, and thus to edger 300, with pin 330.

Another important feature of edger 300 is the locking mechanism, generally 370, for securing the edger 300 in the raised, or transport, position or the lowered, or edging, position. As best shown in FIGS. 20 through 23, locking mechanism 370 is connected to an arm 372 which carries front wheel 374. An axle 378 is attached to arm 372 and supports front wheel 374 for rotation relative to arm 372 and frame 304. Arm 372 includes a cooperating support arm 375 on the opposite side of wheel 374. Axle 378 can be in the form of a bolt, having a hexagonal head 380.

Arm 372 is pivotally connected to a forward frame portion 382 of frame 304 with a pivot pin, generally 384, which could be a bolt, such that the pivoting of arm 372 with respect to frame 304 effectively varies the height of forward portion 382 with respect to the ground, or other support surface, on which edger 300 rests. Arm 372 includes two holes 388, 390, each hole 388, 390 being substantially the same distance from pivot pin 384. In other words, each hole 388, 390 lies on an arc having as its radius the distance from the holes 388, 390 to pivot pin 384. A locking lever, generally 392, is connected to forward frame portion 382 of frame 304 for movement with respect to forward portion 382. Locking lever 392 includes a locking pin 394 fixedly attached to locking lever 392, which is receivable in holes 388, 390.

When it is desired for edger 300 to be in a transport position (FIGS. 15, 20, and 22), locking pin 394 is received in hole 388 of arm 372. When it is desired to lower forward frame portion 382 to the edging position (FIG. 23) to begin an edging operation with edger 300, locking pin 394 is removed from hole 388, and arm 372 is allowed to pivot in a counterclockwise direction, as shown in FIG. 23, about pin 384. This results in a lowering of forward portion 382, which causes a corresponding lowering of edger blade 306 into the ground for performing the edging operation. Once in the edging position, locking pin 394 is inserted into hole 390 for locking edger 300 in the edging position.

Locking lever 392 includes a slot 396 which carries locking pin 394. Locking pin 394 includes an enlarged head portion 398 at one end which prevents locking pin 394 from passing through slot 396. Another enlarged portion 400 is provided along the length of pin 394, and a coil spring 402 bears against washer 404 to spring bias pin 394 outwardly from locking lever 392.

Figure 20:
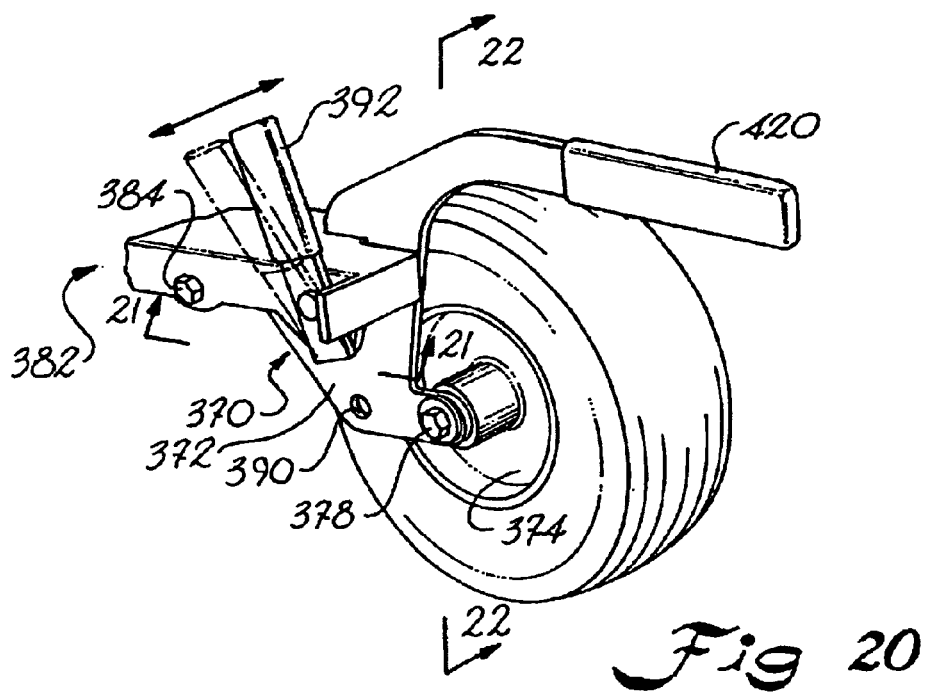
FIGS. 20 and 21 are a partial perspective view of a locking mechanism for the edging machine illustrated in FIG. 15.

Locking lever 392 includes a grip portion 406 which, when pressed by the user, rocks outwardly (as shown by phantom lines in FIG. 20) to disengage locking pin 394 from a hole 388 or 390, as the case may be. The rocking of locking lever 392 is against the force of spring 404, such that when the user releases locking lever 392, locking pin 394 returns to its "home" position, such as shown in FIG. 20 in solid lines. A stop 408 is connected to the forward portion 382 of frame 304 to prevent excessive rotation of locking lever in a side to side manner.

Figure 21:
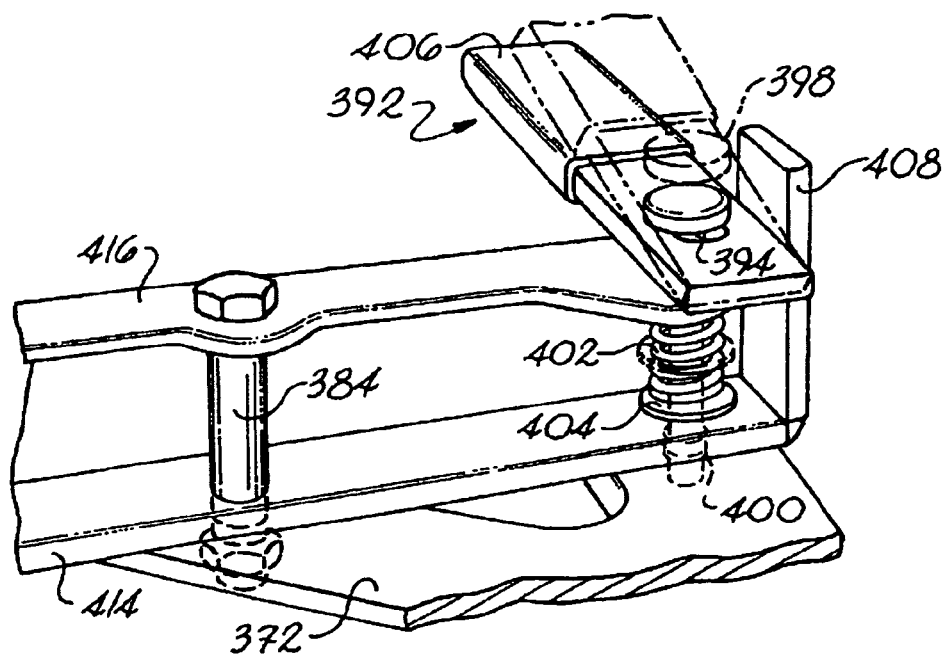
Figure 22:
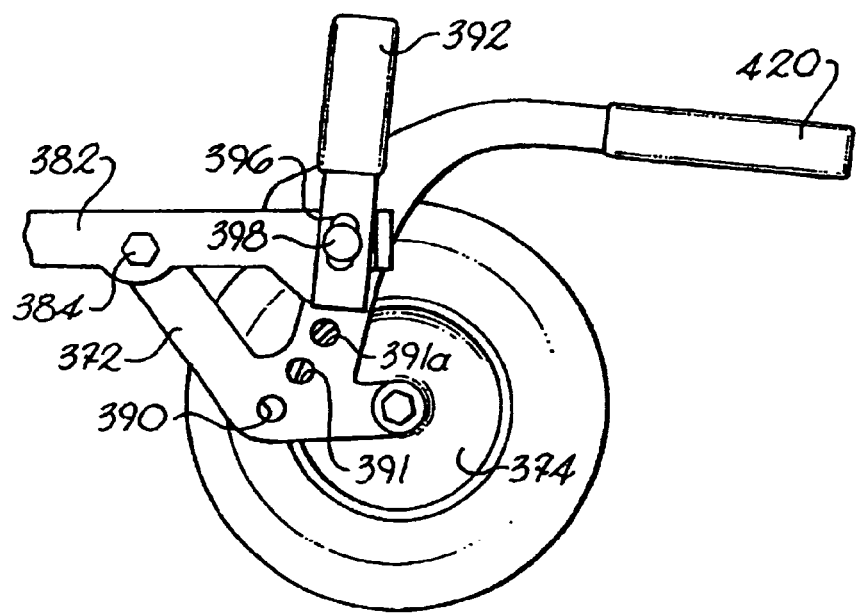
FIGS. 22 and 23 are side elevational views of a locking mechanism for the edging machine illustrated in FIG. 15.

As shown in FIG. 21, forward portion 382 of frame 304 includes two rails 410, 412 having holes 414, 416 which receive locking pin 394. Spring 404 is captured between rails 410, 412 as pin 394 moves between an engaged position (shown in solid lines in FIGS. 20 and 21) with a hole 388 or 390 and a disengaged position (shown in phantom lines in FIGS. 20 and 21).

Arm 372 also includes a forwardly extending handle 420. Handle 420, which preferably extends outwardly beyond wheel 374, is particularly useful in raising and lowering of front wheel 374 between the transport and edging positions. Moreover, handle 420, which is at the extreme forward end of edger 300, may be readily grasped by the user when lifting or lowering of edger 300 during loading and unloading of edger 300. Handle 420 is also handy to use in combination with the handle 310 in its folded, near horizontal configuration, as discussed above, and/or in combination with handles 422, 424 of folding handle 310.

Figure 19:
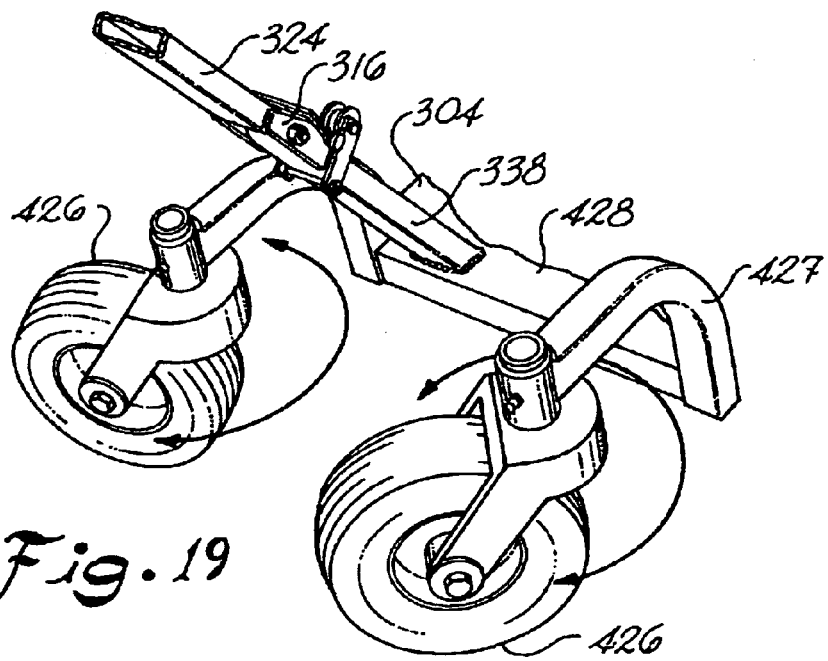
FIG. 19 is a partial perspective view of the caster wheels of the edging machine illustrated in FIG. 15.

As with machine 10, edger 300 includes caster wheels, generally 426, (FIG. 19) attached to arms 427 connected to the rear 428 of frame 304, to increase the maneuverability of edger during use.

Turning to FIGS. 24 through 32, a further alternate embodiment of the present invention, in the form of a compact trencher, generally 500, is illustrated. Trencher 500 can be used for performing trenching operations, such as discussed above with regards to machine 10 and can also be used for installing cable, wire, tubing, conduit, or other elongated flexible material into a trench dug by trencher 500.

FIG. 24 illustrates trencher 500 having a handle 510 which is substantially the same as handle 310, discussed above with respect to edger 300, and operates generally in the same manner as handle 310, having a hinge mechanism 312 substantially the same as hinge mechanism 312. Handle 510 includes a spool axle 513 for holding a spool of cable, wire, tubing (none shown), in a similar fashion as shown in FIG. 1 for laying such material in a trench dug by trenching blade 514. Trenching blade 514 is similar to blade 26, discussed above in connection with machine 10. Likewise, overall operation of the drive for trenching blade 514, including the drive system, generally 518, which is similar to that disclosed above concerning machine 10 and edger 300. Trenching blade 514, is similar to edging blade 200, discussed above. A drive lever 515 is mounted on handle 510 for engaging and disengaging blade 514 for rotation.

Figure 31:
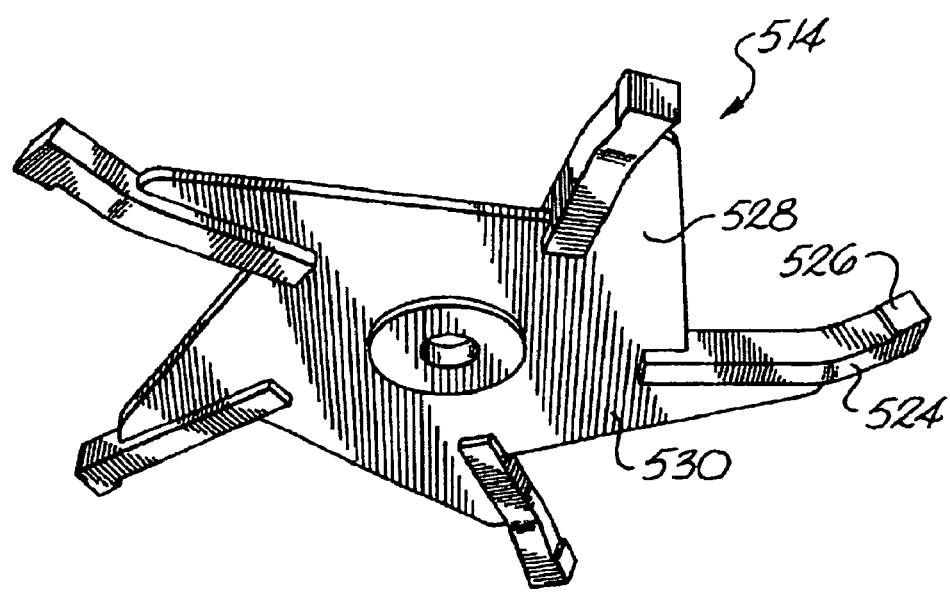
FIG. 31 is a perspective view of a trenching blade constructed in accordance with the present invention.
Figure 32:
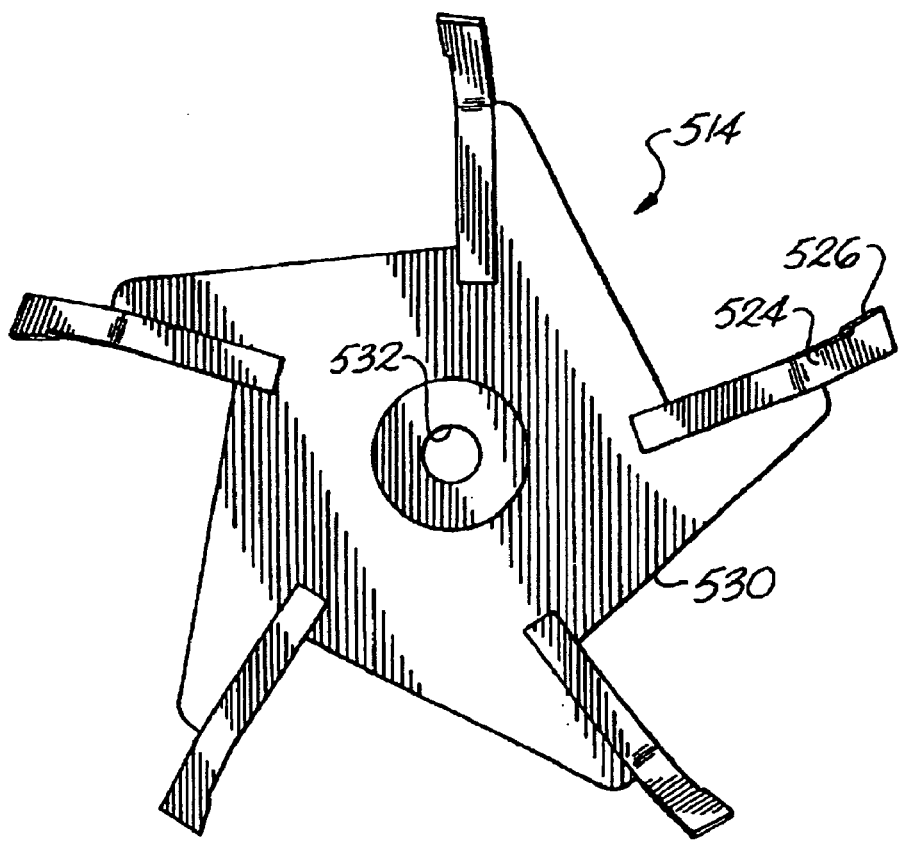
FIG. 32 is a side elevational view of a trenching blade constructed in accordance with the present invention.
Figure 33:
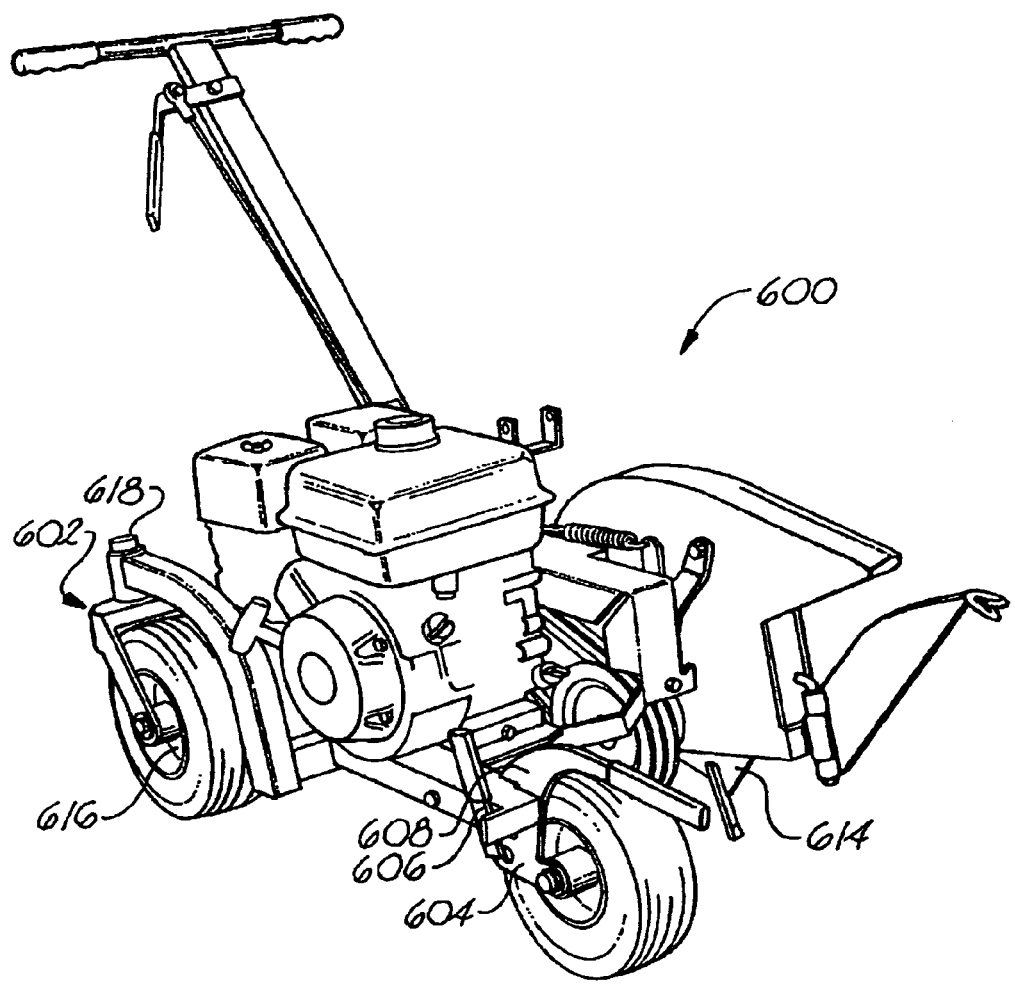

A shroud 520 is attached to the frame 522 and generally encloses the upper portion of blade 514 during use. As shown in FIG. 24, blade 514 rotates in a counterclockwise direction as trencher 500 is pulled rearwardly during use. Blade 514, as shown in FIGS. 31 and 32 include digging fingers 524 to which tips 526, such as carbide tips, are provided. Gusset portions 528 are provided on a central body member 530 of the blade 514, blade 514 having a bore 532 for receiving a bolt 534 for attaching blade 514 to drive pulleys 536 (FIG. 25), similar to pulleys 108, 110 discussed above.

As trencher 500 is pulled rearwardly, dirt is propelled upwardly by digging fingers 524 of blade 514, and such dirt travels generally tangentially through shroud 520 in a counterclockwise path and is ultimately deposited out chute 540 of shroud 520 back into the trench, generally 542, from which it was dug. During laying of cable, wire, or other material, such material passes through a guide opening 544 of a cable guide 546, which is shown in a transport position in FIGS. 24 through 26, and 29, and shown in a trenching position, within trench 542, in FIG. 30. It is to be noted, however, with respect to the FIG. 30 embodiment, that no material is shown being placed in the trench 542, but such material would generally be held on a spool (not shown) carried on spool axle 513. Like machine 10, trencher 500 thus digs a trench, lays material, such as cable, wire, etc., and buries such material in the trench all in one pass.

Comparing trencher 500 to machine 10, trencher 500 is of a compact nature, generally weighing 80 pounds or less. Further, by virtue of folding handle 510, trencher 500 can be reduced to a relatively compact configuration when folding handle 510 is received within receiver bracket 548 and held in place by locking pin 550. As with edger 300 discussed above, once handle 510 is folded and locked into receiver bracket 548, handle 510 can be used for grasping trencher 500 for loading and unloading.

Figure 27:
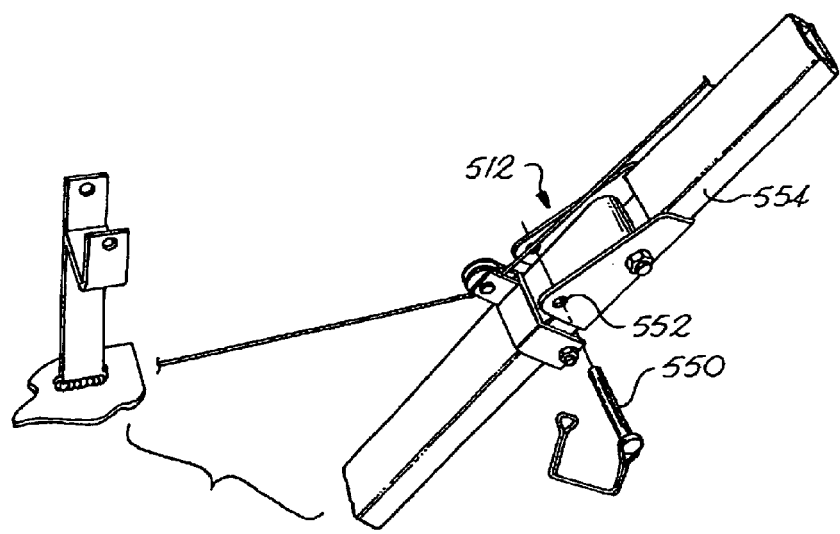
FIGS. 27 and 28 are a partial perspective views of the folding handle mechanism of the edging machine illustrated in FIG. 15 and the trenching machine illustrated in FIG. 24.
Figure 28:
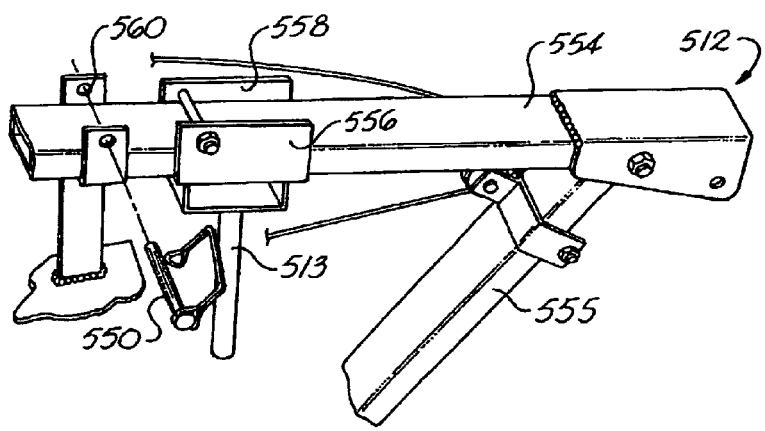
Figure 29:
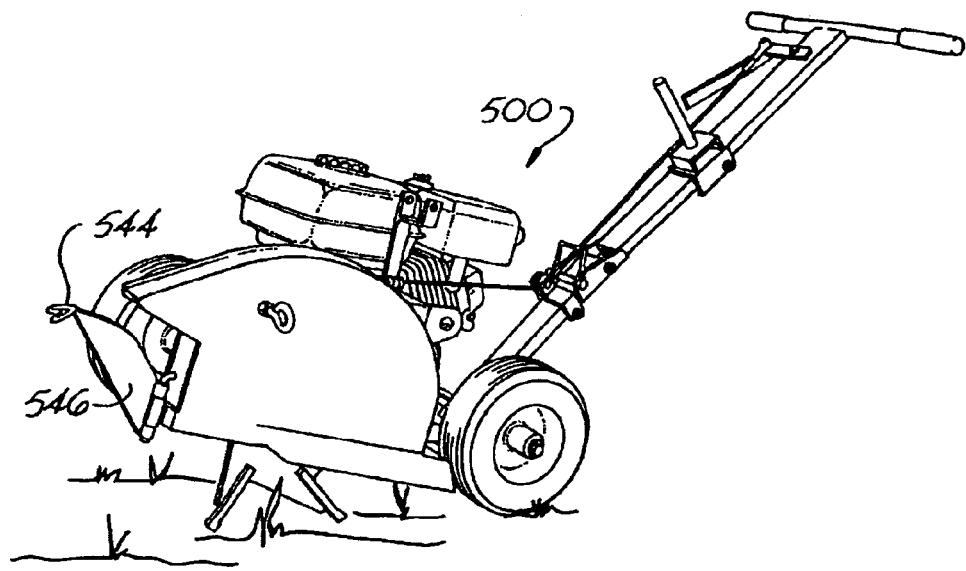
FIG. 29 is a perspective view of the edging machine illustrated in FIG. 24, showing the edging machine in an initial position for digging a trench.
Figure 30:
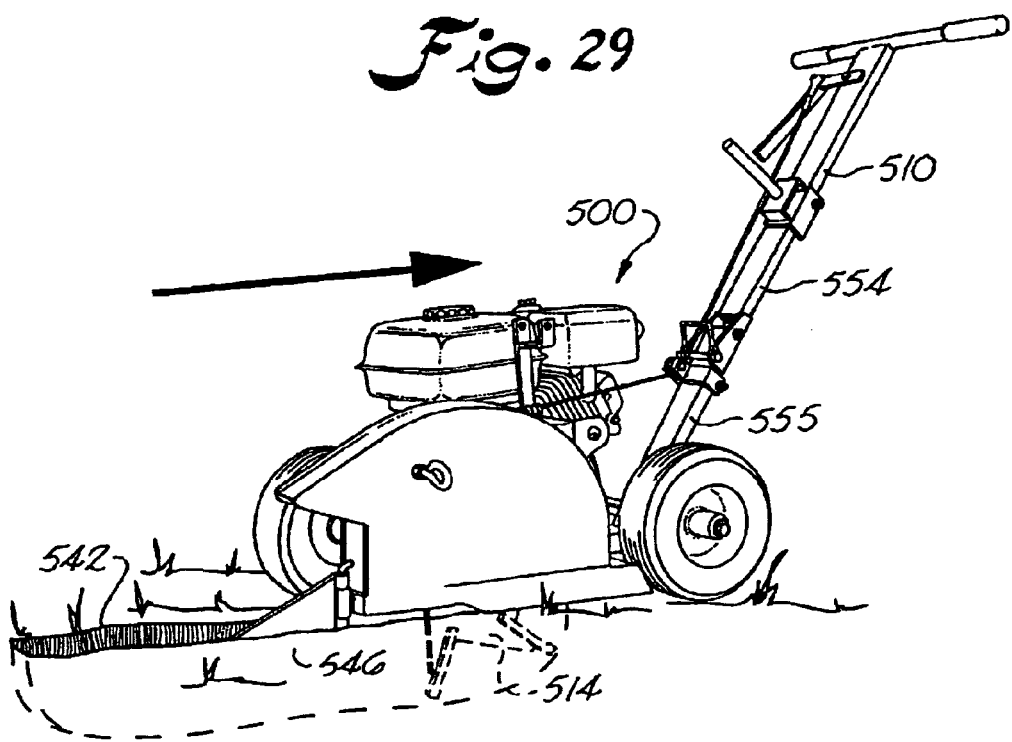
FIG. 30 is a perspective view of the edging machine shown in FIG. 29, in its lowered, trench digging configuration.

FIGS. 27 and 28 illustrate handle 510 in its extended position (FIG. 27) and retracted position (FIG. 28). In FIG. 27, pin 550 has been removed from holes 552 such that upper portion 554 of handle 510 can be folded forward with respect to lower portion 555, for receipt between uprights 556, 558. In FIG. 28, upper portion 554 of handle 510 rests between uprights 556, 558, and pin 552 is inserted into holes 560 of uprights 556, 558 for securing upper portion 554 of handle 510 between uprights 556, 558.

Concerning trenching blade 514, because of the construction of fingers 524, the blade 514 digs a trench in a progressive fashion, thereby reducing the power required in order to dig a trench. For example, using a 5% horsepower engine, the trenching blade can oftentimes be engaged even while the blade is in contact with the ground to be trenched. In other words, it is often not necessary to power up the trenching blade and have it rotating at trenching speed (such as by pushing hand grips 564 downwardly in order to raise trenching blade 514 out of the ground) prior to beginning a trenching operation.

Figure 26:
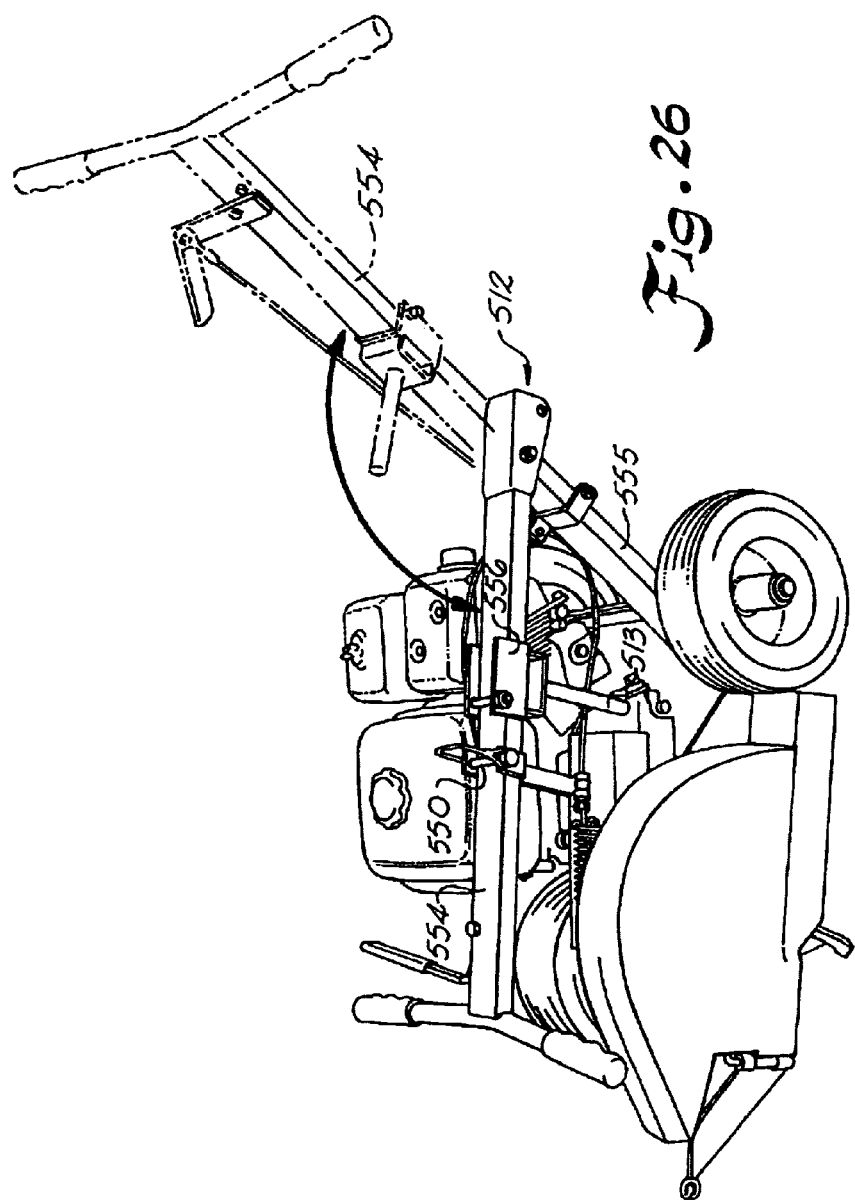
FIG. 26 is a perspective view of the trenching machine illustrated in FIG. 24, and shows in phantom the handle thereof in an extended position, and in solid lines the handle in a folded position.

Edger 300 and trencher 500 are compact machines. Preferably both are constructed in a manner such that their individual weight is approximately 80–85 lbs. or less. When their handles are folded, such as shown in FIGS. 18 and 26, for edger 300 and trencher 500, respectively, a relatively compact configuration results. With respect to edger 300, when handle 310 is folded, the overall length is approximately 32 inches; the overall width is approximately 26 inches; and the overall height is approximately 19 inches.

With respect to trencher 500, when handle 510 is folded, the overall length is approximately 32 inches; the overall width is approximately 25 inches; and the overall height is approximately 19 inches. The dimensions for both edger 300 and trencher 500 translates to an overall volume, when the handles are folded, of less than 10 cubic feet for either machine and renders each machine small enough to be carried in the trunk of many sedans, and in station wagons and other vehicles. Because of the relatively light weight of both edger 300 and trencher 500, they can generally be loaded and unloaded with only one or two persons of average strength.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. An earth working machine, comprising:
a frame having a forward portion and a rearward portion;
a motor connected to said frame;
an earth working blade; said motor being drivingly connected to said earth working blade;
an elongated handle connected to said frame, said handle including a first portion and a second portion, said first portion being of greater length than said second portion and configured for moving between a retracted position and an extended position;
a hinge configured for allowing pivotal movement of said first portion of said handle between said retracted position and said extended position;
said first portion of said handle being configured to be in a generally horizontal position upon said handle being in said retracted position;
said first portion of said handle extending to a first height upon said first portion being in said extended position, and upon said first portion being in said retracted position, said first portion extending to a second height, said second height being substantially less than said first height, such that upon said first portion being in said retracted position, the effective height of said machine is significantly reduced;
a lock for selectively locking said handle in said extended and retracted positions;
an arm pivotally connected to said forward portion of said frame;
at least one wheel connected to said arm;
said arm being configured to be movable between a transport position wherein said earth working blade is generally above the surface of the soil and an earth working position wherein said earth working blade is engaged with the soil for working the soil; and
a locking pin for selectively locking said arm in at least one of said transport and earth working positions.

2. A soil bed edge forming machine, comprising:
a frame having a forward portion and a rearward portion;
a motor connected to said frame;
a soil bed edge forming blade; said motor being drivingly connected to said soil bed edge forming blade;
an elongated handle connected to said frame, said handle including a first portion and a second portion, said first portion being of greater length than said second portion and being configured for moving between a retracted position and an extended position;
a hinge configured for allowing pivotal movement of said first portion of said handle between said retracted position and said extended position;
said first portion of said handle being configured to be in a generally horizontal position upon said handle being in said retracted position;
said first portion of said handle extending to a first height upon said first portion being in said extended position, and upon said first portion being in said retracted position, said first portion extending to a second height, said second height being substantially less than said first height, such that upon said first portion being in said retracted position, the effective height of said machine is significantly reduced;
a lock for selectively locking said handle in said extended and retracted positions;
an arm pivotally connected to said forward portion of said frame;
at least one wheel connected to said arm;
said arm being configured to be movable between a transport position wherein said soil bed edge forming blade is generally above the surface of the soil and a soil bed edge forming position wherein said soil bed edge forming blade is engaged with the soil for forming a soil bed edge; and
a locking pin for selectively locking said arm in at least one of said transport and soil bed edge forming positions.

* * * * *